(12) United States Patent
Halpern-Manners et al.

(10) Patent No.: US 11,995,727 B2
(45) Date of Patent: *May 28, 2024

(54) ROUTING CLAIMS FROM AUTOMATIC ADJUDICATION SYSTEM TO USER INTERFACE

(71) Applicant: CollectiveHealth, Inc., San Francisco, CA (US)

(72) Inventors: Nicholas Halpern-Manners, San Francisco, CA (US); Thomas Bedington, San Francisco, CA (US); Andrew Chang, San Francisco, CA (US); Yulia Eskin, San Francisco, CA (US); Erica Leigh Horowitz, San Francisco, CA (US); Chetan Subramanya Ithal, Sunnyvale, CA (US); Asif Khalak, Belmont, CA (US); Sergio Martinez-Ortuno, Oakland, CA (US); Raphael N'Gouan, Belmont, CA (US); John George O'Leary, San Francisco, CA (US); Izac Benjamin Milstein Ross, San Francisco, CA (US); Xiaowen Ye, Castro Valley, CA (US); Heather Grates, Oakland, CA (US); Irene Victoria Tollinger, Los Altos, CA (US); Henning Chiv, Castro Valley, CA (US)

(73) Assignee: CollectiveHealth, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/945,976

(22) Filed: Sep. 15, 2022

(65) Prior Publication Data

US 2023/0010687 A1  Jan. 12, 2023

Related U.S. Application Data

(63) Continuation of application No. 16/414,673, filed on May 16, 2019, now Pat. No. 11,481,846.

(51) Int. Cl.
*G06Q 40/08* (2012.01)
*G06N 5/025* (2023.01)
(Continued)

(52) U.S. Cl.
CPC ............. *G06Q 40/08* (2013.01); *G06N 5/025* (2013.01); *G06N 20/00* (2019.01); *G06Q 10/10* (2013.01); *G06Q 50/182* (2013.01)

(58) Field of Classification Search
CPC ...... G06Q 40/08; G06Q 10/10; G06Q 50/182; G06N 20/00; G06N 5/025
See application file for complete search history.

(56) References Cited

U.S. PATENT DOCUMENTS

| 5,339,419 A | 8/1994 | Chan et al. |
| 6,235,176 B1 | 5/2001 | Schoen et al. |

(Continued)

FOREIGN PATENT DOCUMENTS

| CA | 2654617 A1 * | 8/2010 | ............. G06Q 10/00 |
| CA | 2654617 A1 | 8/2010 | |

(Continued)

OTHER PUBLICATIONS

"Data Mining to Predict and Prevent Errors in Health Insurance Claims Processing" by Mohit Kumar, Rayid Ghani, and Zhu-Song Mei, dated Jul. 2010 http://www.cs.cmu.edu/~mohitkum/papers/kdd10_rework.pdf (Year: 2010).*

(Continued)

*Primary Examiner* — Scott C Anderson
*Assistant Examiner* — James H Miller
(74) *Attorney, Agent, or Firm* — Lee & Hayes P.C.

(57) ABSTRACT

A claim adjudication system including an automatic adjudication pipeline that uses pipeline rules to automatically adjudicate a claim associated with a benefit plan at one or more stages. The automatic adjudication pipeline can redi- (Continued)

rect the claim to a user interface for manual review when a pipeline rule associated with a manual review condition is triggered. The user interface can present information about the claim relevant to the manual review condition in an integrated format, including highlighting the reasons for the manual review. A user can evaluate the claim in the user interface and provide user input that addresses the manual review condition, and the claim can be routed back to the automatic adjudication pipeline. The user input can also be used as training data for machine learning to adjust pipeline rules that are used to automatically process claims and to redirect future claims for manual review.

20 Claims, 8 Drawing Sheets

(51) Int. Cl.
*G06N 20/00* (2019.01)
*G06Q 10/10* (2023.01)
*G06Q 50/18* (2012.01)

(56) References Cited

U.S. PATENT DOCUMENTS

| | | | |
|---|---|---|---|
| 6,341,265 | B1 | 1/2002 | Provost et al. |
| 7,356,460 | B1 | 4/2008 | Kennedy et al. |
| 10,402,909 | B1 | 9/2019 | Khalak et al. |
| 10,467,379 | B2 * | 11/2019 | Van Arkel ............ G06Q 10/10 |
| 10,552,915 | B1 | 2/2020 | Khalak et al. |
| 10,628,834 | B1 | 4/2020 | Agarwal et al. |
| 2002/0019754 | A1 | 2/2002 | Peterson et al. |
| 2003/0069760 | A1 * | 4/2003 | Gelber ................ G06Q 10/10 705/2 |
| 2003/0191665 | A1 * | 10/2003 | Fitzgerald ............ G16H 50/20 705/2 |
| 2003/0229522 | A1 | 12/2003 | Thompson et al. |
| 2006/0089862 | A1 | 4/2006 | Anandarao et al. |
| 2006/0195329 | A1 | 8/2006 | Choi et al. |
| 2008/0235202 | A1 | 9/2008 | Wang et al. |
| 2009/0295836 | A1 | 12/2009 | King |
| 2010/0031263 | A1 | 2/2010 | Lamothe |
| 2012/0166212 | A1 | 6/2012 | Campbell |
| 2015/0081324 | A1 | 3/2015 | Adjaoute |
| 2015/0370978 | A1 * | 12/2015 | Van Arkel ............ G06Q 10/10 705/2 |
| 2016/0267396 | A1 | 9/2016 | Gray et al. |
| 2017/0017760 | A1 * | 1/2017 | Freese ................ G16H 40/63 |
| 2017/0293894 | A1 | 10/2017 | Taliwal et al. |
| 2018/0239870 | A1 | 8/2018 | Goldman et al. |
| 2018/0349487 | A1 | 12/2018 | Garg et al. |
| 2019/0005198 | A1 | 1/2019 | Richards et al. |
| 2019/0073641 | A1 * | 3/2019 | Utke .................. G06T 7/0004 |
| 2020/0065907 | A1 | 2/2020 | Khalak et al. |
| 2020/0134736 | A1 | 4/2020 | Khalak et al. |
| 2020/0364797 | A1 | 11/2020 | Halpern-Manners et al. |
| 2021/0375490 | A1 * | 12/2021 | Brown ................ G06Q 20/14 |
| 2023/0044782 | A1 | 2/2023 | Khalak |
| 2023/0316412 | A1 * | 10/2023 | Behrens .............. G06Q 10/10 705/4 |

FOREIGN PATENT DOCUMENTS

| | | | | |
|---|---|---|---|---|
| CA | 2654617 | C * | 11/2017 | ............ G06Q 10/00 |
| CA | 26546170 | C | 11/2017 | |
| GB | 2462333 | A * | 2/2010 | ............ G06F 19/328 |
| GB | 2465766 | A * | 6/2010 | ............ G06Q 10/10 |
| WO | WO-02077753 | A2 * | 10/2002 | ............ G06Q 10/063 |
| WO | WO-2013159178 | A1 | 2/2013 | |
| WO | WO-2013159178 | A1 * | 10/2013 | ............ G06Q 10/10 |
| WO | WO-2019041804 | A1 * | 3/2019 | ............ G06Q 10/103 |
| WO | WO-2019100595 | A1 * | 5/2019 | |

OTHER PUBLICATIONS

"Data Mining to Predict and Prevent Errors in Health Insurance Claims Processing" by Mohit Kumar,Rayid Ghani,and Zhu-Song Mei, dated Jul. 2010 htto:/Avww.cs.cmu.edu/~mohitkum/papers/kdd10_rework.pdf (Year: 2010).*

Jonathan Bnayahu; Maayan Goldstein; Mordechai Nisenson; Yahalomit Simionovici; "Making sense of healthcare benefits" dated Jun. 2012, IEEE https://ieeexplore.ieee.org/document/6227116 (Year: 2012).*

Janusz Wojtusiak; Che Ngufor; John Shiver; Ronald Ewald; "Rule-Based Prediction of Medical Claims' Payments: A Method and Initial Application to Medicaid Data" dated Dec. 2011, https://ieeexplore.ieee.org/document/6147666?source=IQplus (Year: 2011).*

Bnayahu et al., "Making Sense of Healthcare Benefits", retrieved on Dec. 15, 2020 at <<https://ieeexplore.ieee.org/document/6227116>>, IEEE, Jun. 2012, pp. 1034-1043.

Dictionary.com, "Machine Learning", retrieved from <<https://www.dictionary.com/browse/machine-learning>>, Mar. 24, 2016, 1 page.

Kumar, et al., "Data Mining to Predict and Prevent Errors in Health Insurance Claims Prosessing", Analytics Vidhya, retrieved at https://www.analyticsvidhya.com/blog/2017/09/common-machine-learning-algorithms/>>2017, 9 pgs.

Office Action for U.S. Appl. No. 16/414,673, dated Jul. 23, 2021, Halpern-Manners, "Routing Claims From Automatic Adjudication System to User Interface", 30 Pages.

Non Final Office Action dated Jun. 27, 2020 for U.S. Appl. No. 16/414,673, "Routing Claims From Automatic Adjudication System to User Interface", Manners, 40 pages.

Office Action for U.S. Appl. No. 16/555,511, dated Jan. 13, 2021, Khalak, "Machine Structured Plan Description", 8 pages.

Office Action for U.S. Appl. No. 16/414,673, dated Jan. 15, 2021, Halpern-Manners, "Routing Claims From Automatic Adjudication System to User Interface", 34 pages.

Office Action for U.S. Appl. No. 16/107,262, dated Oct. 31, 2018, Khalak et al., "Machine Structured Plan Description", 10 pages.

Office Action for U.S. Appl. No. 16/414,673, dated Nov. 17, 2021, Halpern-Manners, "Routing Claims From Automatic Adjudication System to User Interface", 32 Pages.

Office Action for U.S. Appl. No. 16/107,396, dated Nov. 8, 2018, Khalak et al., "Machine Structured Plan Description", 14 pages.

Office Action for U.S. Appl. No. 16/107,262, dated Apr. 24, 2019, Khalak et al., "Machine Structured Plan Description", 7 pages.

Ramamurthy, "A Configurable, Big Data System for On-Demand Healthcare Cost Prediction", retrieved at <<https://ieeexplore.ieee.org/stamp/stamp.jsp?tp=&arnumber=8258086>>, 2017, pp. 1524-1533.

Ray, "Commonly used Machine Learning Algorithms ( with Python and R Codes)", Analytics Vidhya, retrieved at <<https://www.analyticsvidhya.com/blg/2017/09/common-machine-learning-algorithms/>>, 2017, 69 pgs.

Wojtusiak, et al., "Rule-based Prediction of Medical Claims' Payments: A Method and Initial Application to Medicaid Data", retrieved on Dec. 15, 2020 at <<https://ieeexplore.ieee.org/document/6147666?source=IQplus>>, Dec. 2011, pp. 162-167.

* cited by examiner

| CLAIM STATUS | OVERVIEW | SAVE | DENY | ROUTE | PAY |
|---|---|---|---|---|---|
| Adjudication Rules & Errors <u>202</u> | CLAIM COSTS <br> <u>Date</u>    <u>Code</u>    <u>Benefit</u>      <u>Billed</u>    <u>Allowed</u>    <u>Plan Pays</u>    <u>Member Pays</u> <br> 11/14/18   M54.2   HOP_Therapeutic   $700   $400   $360   $40 <br> 11/14/18   B22.9   ! NO MATCH   $400   --   --   -- <br> 11/14/18   A51.4   HOP_Pharmacy   $55   $60   $50   $10 <br> 11/14/18   M17.1   ! 2+ MATCHES   $500   --   --   -- <br><br> Edit Benefit    BENEFIT: [HOP_ER]    COST SHARE INFO <br>               BENEFIT DESCRIPTOR    10% Co-insurance <br>               Emergency Room     No bundling <br>               Notes: [(Optional)]    [CANCEL] [SAVE] |
| Claim Overview Data <u>204</u> | |
| Participant Data <u>206</u> | Totals:   Billed: $1655    Copay: $10    Plan Pays: $410 <br>          Discount: $0    Deductible: $40    Member Pays: $50 <br>          Allowed: $460    Coinsurance: $0 <br>          Denied: $0    Not Covered: $300 |
| Provider Data <u>208</u> | ACCUMULATORS <br> Deductible    In-Network             Out-Of-Network <br>                Individual   $220 / $1000    Individual   $50 / $2000 <br>                 This Claim:   + $40     This Claim:   + $0 <br>                 Preview   $260 / $1000    Preview   $50 / $1000 <br><br>                 Family   $600 / $3000    Family   $150 / $6000 <br>                 This Claim:   + $40     This Claim:   + $0 <br>                 Preview   $640 / 3000    Preview   $150 / $6000 |
| Incident Data <u>210</u> | Out-of-Pocket Maximum    In-Network        Out-Of-Network <br>                 Individual   $800 / $4000    Individual   $200 / $5000 <br>                 This Claim:   + $50     This Claim:   + $0 <br>                 Preview   $850 / $4000    Preview   $200 / $5000 |
| Diagnosis Data <u>212</u> |                 Family   $1250 / $7000    Family   $300 / $8000 <br>                 This Claim:   + $50     This Claim:   + $0 <br>                 Preview   $1300 / $7000    Preview   $300 / $8000 |

FIG. 2

ROUTING CLAIMS FROM AUTOMATIC ADJUDICATION SYSTEM TO USER INTERFACE

RELATED APPLICATIONS

This U.S. Patent Application is a continuation of, and claims priority to, U.S. patent application Ser. No. 16/414,673, filed on May 16, 2019, the entirety of which is incorporated herein by reference.

BACKGROUND

Administrators can offer and manage benefit plans that provide one or more benefits to plan participants. For example, a benefit plan can be a health plan that offers benefits that fully or partially cover the cost of certain medical services for plan participants. In some examples, an administrator can be a third party that administers a benefit plan on behalf of a sponsor. For example, an employer can be a sponsor that offers health plans to its employees, and the administrator can be a third party that administers the health plan for the employer.

An administrator can receive claims submitted by providers or by plan participants and adjudicate those claims according to the benefits of a benefit plan. For example, the administrator can adjudicate a claim to determine whether to approve or deny the claim. The administrator may also determine cost sharing parameters of an approved claim, such as how much of the cost of a covered service should be paid by the plan participant and how much should be paid by a sponsor.

Conventional manual review of claims can be expensive, time-consuming, and/or error-prone, especially when a large number of claims are waiting to be reviewed. For example, human claims adjustors may need to research information from multiple sources when evaluating a single claim, including but not limited to plan documentation, medical codes, service provider guidelines, sponsor policies, state and national regulations, and communications with service and network providers. Reviewing information from multiple sources can take time and effort, and may lead to errors if a reviewer misses information from one or more of the multiple sources that would affect how a claim should be processed. Delays due to manual claim adjudication can lead to frustration, as providers, plan participants, and other entities may need to wait for weeks or months to find out if submitted claims will be approved and/or if the full amount that was billed will be paid.

Some administrators use automatic adjudication systems to ease the burden on human claims adjustors and decrease the time it takes to adjudicate claims. However, such automatic adjudication systems are often hard coded and inflexible, and updating them to handle new types of claims or claims with uncommon attributes can be difficult and costly. If claims cannot be handled by conventional automatic adjudication systems, the claims can be reviewed manually. However, conventional manual review processes can again take more time and/or be more error-prone than automatic adjudication systems. Additionally, in such conventional manual review processes, human claims adjustors are often not provided with contextual information about why a claim could not be reviewed automatically, and may need to evaluate such a claim under normal review processes based on multiple sources of information.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 depicts an example presentation of a user interface for a claim adjudication system.

DETAILED DESCRIPTION

Figure 1A:
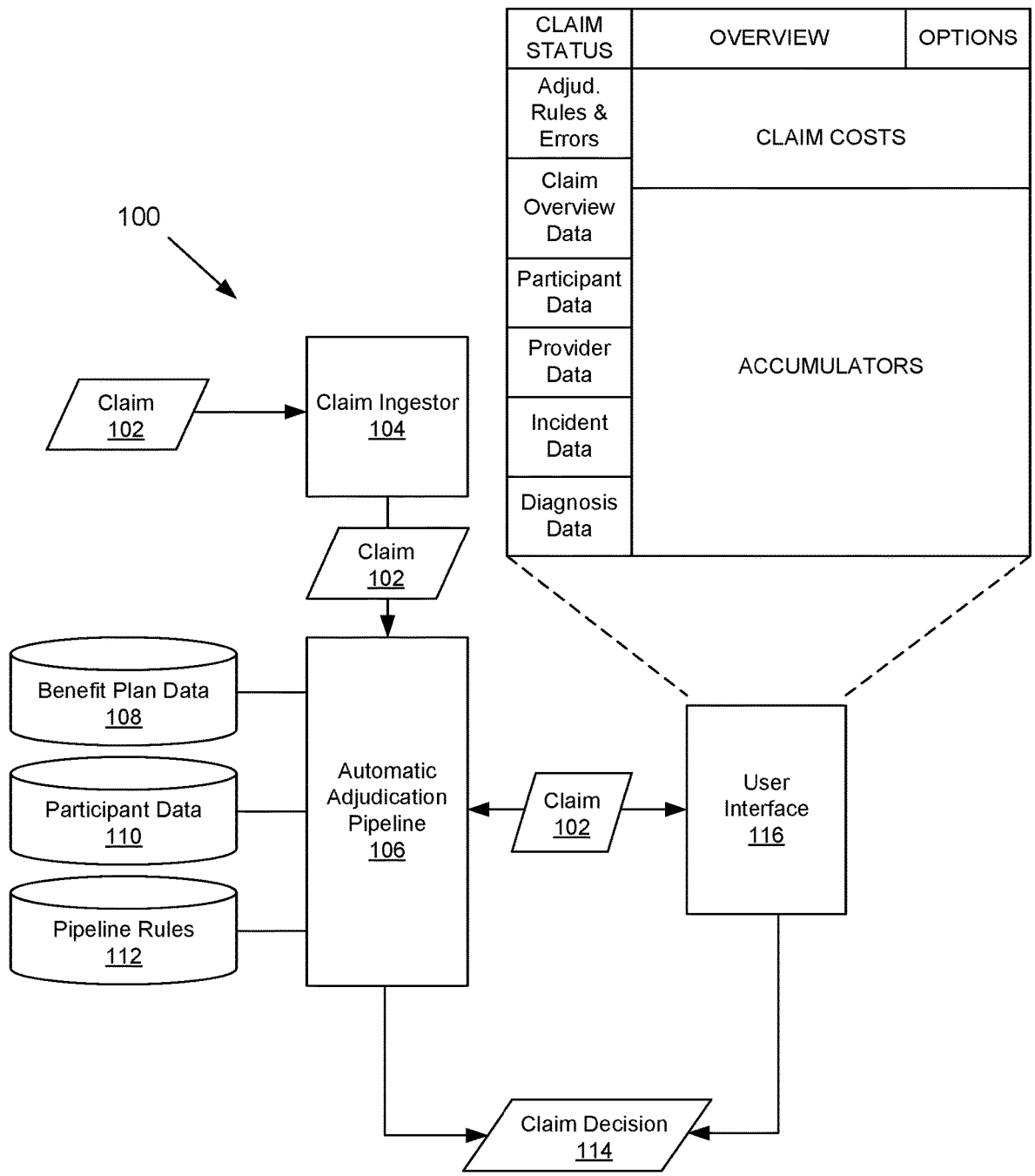
FIGS. 1A and 1B depict example environments for a claim adjudication system that can receive and process claims related to benefit plans.

The techniques described herein are directed to intelligently adjudicating claims associated with a benefit plan at least in part using an automatic adjudication pipeline that applies rules to a claim at different stages. If the automatic adjudication pipeline determines that a manual review condition applies to a claim, the claim can be redirected from the automatic adjudication pipeline to a user interface for manual review. The user interface can display context-relevant information associated with the manual review condition, thereby surfacing important information in the user interface about why the claim was redirected for manual review.

In the manual review user interface, a user can review the surfaced context-relevant information to quickly and efficiently address the reasons why the claim was redirected for manual review. Because the user interface surfaces important context-relevant information about the redirected claim, the risk of incorrect manual processing can be reduced compared to conventional systems in which manual reviewers must look up information from multiple sources. After the user has manually evaluated the claim through the user interface, the claim can be returned to the automatic adjudication pipeline. Any user input provided during the manual review can be used as training data for machine learning to update the rules implemented by the automatic adjudication pipeline. Accordingly, over time the system can learn how to properly process a greater percentage of claims automatically and cause fewer claims to be redirected for manual review.

A benefit plan can be a plan or policy that provides one or more benefits or services to plan participants. In some examples, a benefit plan can be a health plan that provides plan participants with benefits including coverage of one or more medical services. In other examples, a benefit plan can be a travel plan that offers various travel benefits, a real-estate lease, an investment portfolio plan, an employee perks and assistance plan, or any other type of plan or policy.

In some examples, an administrator can administer a benefit plan on behalf of a sponsor. For example, a sponsor can be an employer that offers a health plan to its employees, and the administrator can be a third-party entity that provides plan documentation to plan participants and potential plan participants of the health plan, as well as adjudicating claims against the health plan that have been submitted by plan participants or by medical providers. In other examples, the sponsor can be an insurance company or any other entity that offers a benefit plan, but uses a third-party administrator to administer the benefit plan. In still other examples, the administrator can itself be an insurance company or other entity that directly offers a benefit plan.

Claims can be filed by various parties against a benefit plan to track usage of benefits, to have the administrator determine whether a provided service is covered by the benefit plan, to have the administrator determine a cost sharing arrangement between parties for a provided service, and/or for other reasons. Claims can include claims submitted by service providers that have rendered services to plan participants. Such service providers can include in-network providers associated with the benefit plan and out-of-network providers that are not associated with the benefit plan, such that plan participants may be liable for a higher portion of the cost of a service provided by an out-of-network provider. Claims can also be submitted by plan participants to request reimbursement of costs paid to obtain services. In other examples, a sponsor of a benefit plan may submit claims in order to track how benefits are being used by plan participants. In some cases, such sponsor-submitted claims can be submitted to help keep track of how certain benefits are being used by plan participants, and accordingly may be submitted as zero dollar value claims. In other cases, such sponsor-submitted claims can be submitted to determine a cost-sharing arrangement between the sponsor and a plan participant for a particular provided service.

When a claim is submitted, the administrator can adjudicate the claim to determine whether to approve or deny the claim, in some cases approving or denying elements of a claim granularly on a line-by-line or service-by-service basis. If portions of the claim are approved, the administrator may determine cost sharing arrangements associated with approved portions of the claim that share the cost between the plan participant and a sponsor or another entity associated with the benefit plan. For example, when the benefit plan is a health plan, a medical provider that has rendered services to a plan participant can file a claim against the health plan for the cost of those services. The administrator can then adjudicate the claim. For instance, as part of the adjudication, the administrator may determine that the plan participant is liable for paying 20% of the cost of approved services, while the health plan's sponsor should pay the remaining 80%. As another example, when the benefit plan is a real-estate lease in which a landlord provides various benefits to a tenant in exchange for rent payments according to the benefit plan, a claim can be a request by a tenant for reimbursement of a repair cost. In this example, the adjudication can involve determining how much of the repair cost is to be reimbursed by the landlord and how much is to be borne by the tenant. As yet another example, when the benefit plan is a travel club membership plan, a claim can be a request by a plan participant to book a hotel room at a discounted rate, and the adjudication can involve determining how much of the hotel room's full rate is to be paid by the plan participant and how much is to be paid by a sponsor.

It can be expensive and time-consuming for administrator personnel to manually review and process claims. For example, it can take time for a human claims adjustor to evaluate a claim submitted by a medical provider to ensure that medical services rendered by the medical provider to a patient are actually covered by a benefit plan that the patient participates in, review the claim for potential errors or fraud, calculate how much the benefit plan covers and how much the patient covers, and/or process the claim in other ways. The time to manually evaluate a claim can be exacerbated when there are a large number of claims to be reviewed. Providers who submit claims can often become frustrated when there are delays in receiving an adjudication decision after a claim has been submitted, such as if it takes weeks for the administrator to provide an adjudication decision. In addition, in some situations, regulations or other rules can require that claims be adjudicated within certain timeframes, such that administrators may need to ensure they have enough personnel to process large numbers of claims within such deadlines. Accordingly, there are incentives to adjudicating as many claims as possible via automatic adjudication systems, as this can reduce the workload on human claims adjustors as well as decreasing the time for claims to be adjudicated.

The claims adjudication system described herein can learn over time how to automatically process a greater percentage of claims automatically, such that fewer claims are redirected for manual review. Accordingly, over time more claims can be automatically processed quickly and accurately without manual intervention, and fewer claims can be redirected for more expensive and time-consuming manual review. For example, the claims adjudication system described herein can have an automatic adjudication pipeline with a modular stage-based architecture that allows individual stages to be individually configured. Stages of the automatic adjudication pipeline can be reconfigured to handle different types of claims and/or handle newly discovered issues with claims. Accordingly, rather than hard coding adjudication decisions like conventional systems, the automatic adjudication pipeline can be updated over time to handle more and more claims via machine learning and other processes. Additionally, over time as more claims are automatically processed and fewer claims are redirected for manual review, the amount of computing resources dedicated to providing user interfaces for human reviewers can be also be decreased.

There can also be an incentive in making it quicker for human claims adjustors to review those claims that are ultimately routed to them. For example, many conventional systems display claim data in one window, patient contact information in another window, claim accumulator data about the patient in yet another window, allowable claim limits in still another window, and so on. In many cases, such disparate types of data are provided through different applications on a computer, such that users must have multiple applications, windows, and/or tabs open at the same time and switch between them frequently when processing a claim. Managing such user interface elements, and remembering which ones to use to find desired information, can lead to errors and/or add to the time it takes human claims adjustors to adjudicate claims. The claims adjudication system described herein can present such information in a cohesive and integrated user interface in which the most relevant data is presented in, and is editable in, a single view such that users see a "single source of truth" with respect to claim data. This can decrease the computing resources needed to run multiple applications or windows. It can also allow users to more quickly navigate through the user interface when processing claims, and quickly see the most relevant data about a claim such that the risk of human error is reduced during manual review of claims.

Moreover, the user interface described herein can flag or otherwise highlight specific information related to why a particular claim was redirected from automatic adjudication to manual review, such that a user can more quickly see what information should be reviewed, make edits if necessary, and return the claim to automatic processing. Accordingly, the user may not need to fully process claims, but just correct issues that may have prevented full automatic processing of the claims. This can decrease the amount of time and effort needed to manually review claims and reach consistent, accurate results, again increasing user efficiency and navigation speed, as well as decreasing computing resources needed to display claim data in a user interface for long periods of time.

Example Environment

FIG. 1A depicts an example environment for a claim adjudication system 100 that can receive and process claims 102 related to benefit plans. In some examples, a claim 102 can be submitted to the claim adjudication system 100 from a provider directly or via an intermediary, such as a claim 102 from a medical provider for the cost of specific medical services rendered to a plan participant of a health plan. In other examples, a claim 102 can be submitted to the claim adjudication system 100 from a plan participant of a benefit plan, such as a request for reimbursement for the cost of services that the plan participant paid for out of pocket, a request for the administrator or a sponsor to pay for a service according to a benefit of the benefit plan, or a request to apply a payment amount from the plan participant to a service provided according to a benefit of the benefit plan. In addition, some claims 102 may be submitted to the claim adjudication system 100 on a regular basis, such as claims 102 submitted weekly, monthly, or annually without respect to physical services being rendered, such as claims 102 associated with benefits granting a subscription to a health application or other application.

The claim adjudication system 100 can include one or more claim ingestors 104 that can receive claims 102 as a file or other data from providers, plan participants, sponsors, and/or any other source, such as networks, clearinghouses, or other intermediaries. A claim ingestor 104 can be a File Transfer Protocol (FTP) server to which claims 102 can be transferred, a web page or mobile application with a user interface allowing users to upload claims 102, or any other interface or system through which an external entity can submit a claim 102.

In some examples, a claim ingestor 104 can be configured to evaluate a submitted claim 102 and transform the claim 102 into a standard format used by the claim adjudication system 100. For example, when a claim 102 is submitted as a scanned digital copy or a digital photograph of a paper form, a claim ingestor 104 can use optical character recognition (OCR), keyword searches, and/or other data processing operations to recognize information in the scanned digital copy and automatically fill in appropriate fields of a digital template for a claim 102 without human interaction. In some examples, machine learning trained on past claims 102 or sample claims 102 can be used to identify relevant information in a submitted file. Accordingly, even if external entities submit claims 102 in different formats, claim ingestors 104 can recognize data in the submitted claims 102 and transform or reorganize it into a common digital format or data structure that can be used by other elements of the claim adjudication system 100. Although a file in a common digital format, or data structure, generated by a claim ingestor 104 can differ in some respects from a claim 102 as it was originally submitted to the claim ingestor 104, the description herein also refers to the claim ingestor's output as a claim 102. The claim ingestors' transformation of claims 102 into a common format or data structure can reduce computing resources of the claim adjudication system 100 overall, relative to configuring subsequent elements of the claim adjudication system 100 to handle claims 102 in multiple formats.

In some examples, the claim ingestor 104 or other component of the claim adjudication system 100 can also receive separate invoices that are associated with claims 102. In these examples, the claim adjudication system 100 can match submitted claims 102 to submitted invoices, and provide both pieces of data as a claim 102 to the automatic adjudication pipeline 106. In some examples, associated claims 102 and invoices can be compared to detect information that does not match or other errors, and flag the claim 102 for adjustment based on the discrepancy with the invoice. In some examples, the automatic adjudication pipeline 106 discussed below can be configured to automatically adjust the claim 102 based on the discrepancy, while in other examples the claim 102 can be redirected for manual review if the discrepancy cannot be automatically addressed during automatic adjudication.

A claim 102 received, and/or operated on, by a claim ingestor 104 can be routed to an automatic adjudication pipeline 106. For example, a claim 102 can be sent as a data structure or other file by a claim ingestor 104 to the automatic adjudication pipeline 106. The automatic adjudication pipeline 106 can include a plurality of stages through which a claim 102 can be routed, as will be discussed further below with respect to FIG. 1B. The automatic adjudication pipeline 106 can have access to benefit plan data 108, participant data 110, and pipeline rules 112 that can be used at one or more stages of the automatic adjudication pipeline 106 to adjudicate the claim 102 automatically without human interaction at the stages. After a claim 102 has passed through the automatic adjudication pipeline 106 and been automatically adjudicated, the automatic adjudication pipeline 106 can output a claim decision 114.

The automatic adjudication pipeline 106 can be modular, such that stages of the automatic adjudication pipeline 106 can be individually configured, for example by changing corresponding pipeline rules 112. Additionally, different combinations of stages may be used to automatically process different types of claims 102, or instances of the same type of claim 102 that are associated with different sponsors or benefit plans. Accordingly, the modularity and configurability of the stages allows the automatic adjudication pipeline 106 to be highly flexible to handle different types of claims 102 and/or for different entities. In some examples, machine learning can be used to, over time, adjust the configuration of one or more individual stages of the automatic adjudication pipeline 106. Such machine learning can be trained based on data about how previous claims 102 have been automatically or manually adjudicated, based on expert knowledge, based on statistical inference modeling, and/or based on other forms of on-line or off-line feedback. In some cases, machine learning may lead to an evolution of how one stage operates to handle new types of claims, while other stages may already be able to handle those new types of claims without adjustment. The modularity of the stages thus allows any one or more of the stages to be individually reconfigured, or to be added or removed without changing other stages.

Benefit plan data 108 can describe attributes of a benefit plan, including the benefits it covers and/or associated cost sharing arrangements. In some examples, benefit plan data 108 can specify that different benefits and/or cost sharing arrangements may apply to a plan participant at different coverage stages. For example, coverage stages for a health plan can include different cost-sharing stages a plan participant goes through during the course of a health plan year, including a pre-deductible stage in which deductible limits have not yet been met, a post-deductible stage after deductible limits have been met, and a stage in which out-of-pocket maximums have been met. Different cost sharing arrangements may apply to different coverage stages. For example, a plan participant may be liable for the cost of all covered services during a coverage stage before a deductible has been reached, a coinsurance percentage during a different coverage stage after a deductible has been reached but before an out-of-pocket maximum has been reached, and no portion of the cost during a later coverage stage after reaching the out-of-pocket maximum, with a plan sponsor covering any portion of the cost for which the plan participant is not liable.

In some examples, benefit plan data 108 can be a machine structured plan description (MSPD) that defines attributes of a benefit plan, as described in more detail in U.S. patent application Ser. No. 16/107,396, filed on Aug. 21, 2018, which is incorporated by reference herein.

Participant data 110 can include information about plan participants, such as their names, dates of birth, member identification numbers, which benefit plan they are associated with, which sponsor they are associated with, accumulator data, and/or any other information. For example, the participant data 110 can include data about accumulators associated with a plan participant. Some accumulators can track a dollar value that is applicable to a particular category for a current plan period, relative to a maximum value for that category. Other accumulators can also track other non-monetary amounts relative to limits, such as a number of treatment sessions in a current plan period up to a maximum number of covered sessions, a number of hearing aids ordered over a certain period up to a maximum allowed number, or any other values associated with different categories. In some examples, accumulator categories can include categories relevant to various coverage stages, such as accumulators tracking dollar amounts for which the plan participant is responsible that have been applied to deductibles and out-of-pocket maximums for that plan participant. Various accumulators for the same or different categories can be associated with the same plan participant, including accumulators for in-network services and out-of-network services, as well as accumulators for the individual plan participant as well as accumulators for the plan participant's family.

Pipeline rules 112 can include adjudication rules and/or pend rules that can be applied at one or more stages of the automatic adjudication pipeline 106. Pipeline rules 112 can be rules, specifications, and/or computer-executable instructions that indicate how individual stages of the automatic adjudication pipeline 106 should process a claim 102, as will be discussed further below with respect to FIG. 1B.

Adjudication rules can define how particular stages of the automatic adjudication pipeline 106 should interpret input data, such as data in a claim 102, benefit plan data 108, participant data 110, and/or output of one or more previous stages, to generate output data that can be passed to a subsequent stage in the automatic adjudication pipeline 106 or be output as a final claim decision 114. For example, adjudication rules can define what types of input data a stage should use and/or process, what type of output data the stage should produce, and/or what specific operations or types of operations the stage should use to convert the input data to output data. Adjudication rules can therefore define how one or more individual stages of the automatic adjudication pipeline 106 are to automatically adjudicate claims 102 without human interaction.

As an example, if a claim 102 can be automatically processed by the stages of the automatic adjudication pipeline 106 and no pend rules are triggered as discussed below, a final claim decision 114 can be output without human involvement in a relatively short period of time, such as a few minutes. For example, a member who has paid for provider services out of pocket can submit an out-of-network claim by taking a photograph of a bill from the provider with a mobile device, and use a mobile application or website to submit the photograph to a claim ingestor 104. The claim ingestor 104 can perform OCR processing to identify information about the claim 102 from the photograph, and pass the claim 102 on to the automatic adjudication pipeline 106. The claim 102 can pass through the stages of the automatic adjudication pipeline 106 and be processed at each stage by corresponding adjudication rules. As discussed further below, the claim 102 can then be evaluated to determine if any pend rules were triggered, however if no pend rules were triggered a final claim decision 114 can be generated without input from a human reviewer. The claim decision 114 can be sent to, or be retrieved by, a payment processing system that can cause a dollar amount identified in the claim decision 114 to be paid to the member, such as by issuing a check or by performing a digital funds transfer to an account associated with the member. The claim decision 114 and/or a notification of the payment can also be communicated to the member, such as through an email, text message, or notification associated with the mobile application the member used to submit the photograph of his or her bill. In this situation, because no pend rules were triggered that would have led to the claim 102 being redirected for manual review as discussed below, the entire process from the member submitting the photograph to the payment and/or notification being made can proceed automatically and take a relatively short amount of time, such as five minutes or less.

Pend rules can indicate manual review conditions that, if triggered, can prevent the automatic adjudication pipeline 106 from issuing a claim decision 114 automatically and instead redirect a claim 102 from the automatic adjudication pipeline 106 to a user interface 116 for manual review. For example, pend rules can be associated with manual review conditions, including error conditions, policy conditions, or contractual requirements that indicate a claim 102 should be manually reviewed. Pend rules associated with error conditions may relate to errors that indicate one or more stages may not be able to properly process a claim 102, and/or that one or more stages have already improperly processed a claim 102. Pend rules associated with policy conditions or contractual requirements may indicate that a claim 102 should be manually reviewed for one or more business reasons, even if the claim 102 may otherwise be able to be fully processed by the automatic adjudication pipeline 106. Redirection of a claim 102 to the user interface 116 based on a triggered pend rule will be discussed in further detail below with respect to FIG. 1B. Additional details associated with the user interface 116 are described below with reference to FIG. 2.

Figure 1B:
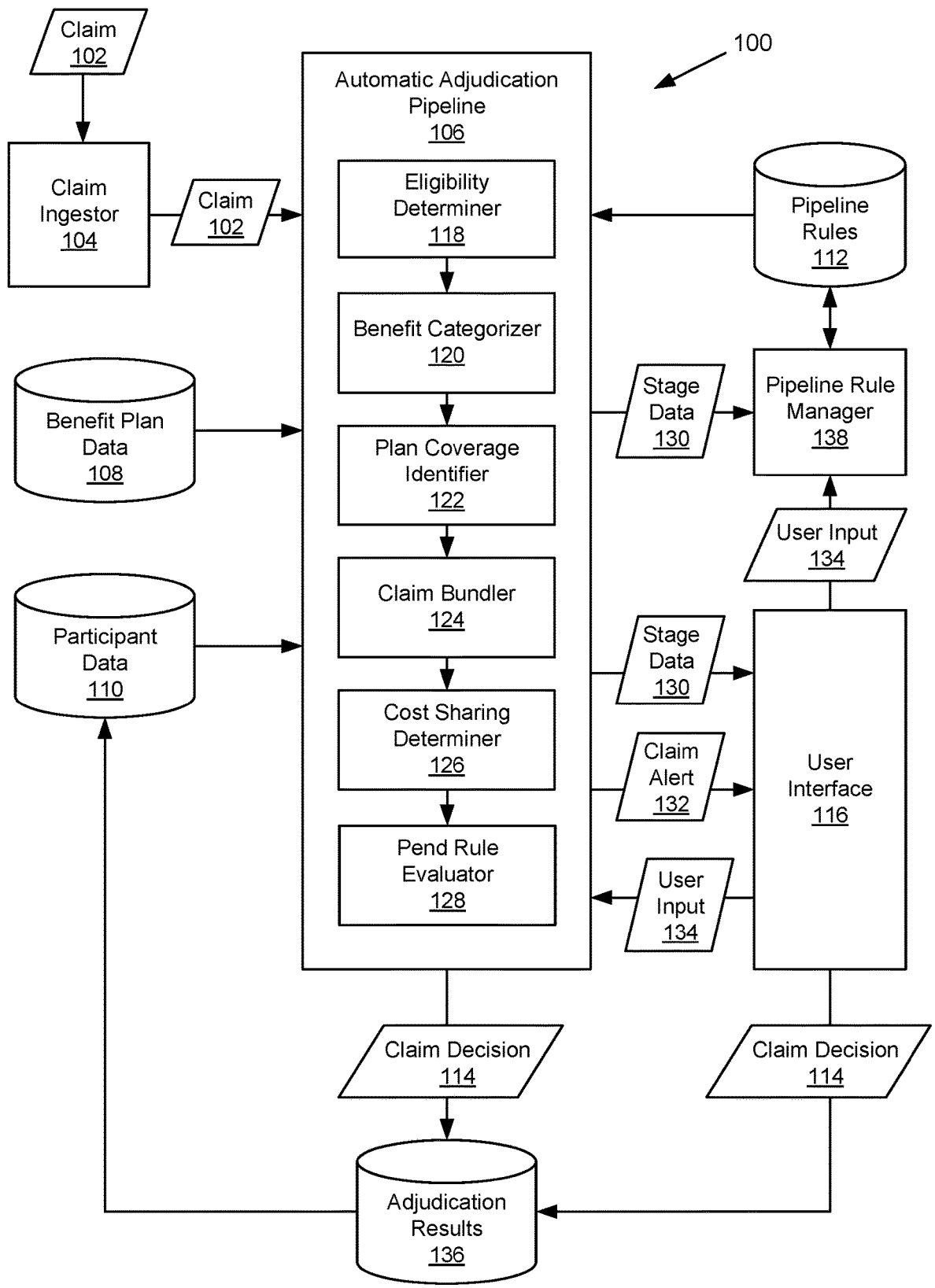

As discussed above, the automatic adjudication pipeline 106 can include a plurality of stages through which a claim 102 can be routed. FIG. 1B depicts an example of individual stages within the automatic adjudication pipeline 106 shown in FIG. 1A, including an eligibility determiner 118, a benefit categorizer 120, a plan coverage identifier 122, a claim bundler 124, a cost sharing determiner 126, and/or a pend rule evaluator 128. Each of these stages can automatically process a claim 102 in a different way without human interaction, based at least in part on pipeline rules 112, and can pass its results on as input to the next stage, to the user interface 116, or as a final claim decision 114. As will be described further below, the pend rule evaluator 128 can be a final stage of the automatic adjudication pipeline 106 that can redirect a claim 102 from the automatic adjudication pipeline 106 to the user interface 116 for manual review if the pend rule evaluator 128 determines that the claim 102 triggers one or more manual review conditions identified by pend rules. In other examples, the pend rule evaluator 128 can be a separate element that is not considered a stage of the automatic adjudication pipeline 106, but evaluates how the automatic adjudication pipeline 106 processed a claim 102 overall and/or during individual stages to determine if that processing triggered any pend rules.

An eligibility determiner 118 can be a stage of the automatic adjudication pipeline 106 that uses pipeline rules 112 to determine if a person identified in a claim 102 is eligible for coverage, based on whether the person had an active benefit plan membership at the time services associated with the claim 102 were rendered. For example, the eligibility determiner 118 can review a claim 102 for information about dates of services as well as identifying information about a person, such as a name, date of birth, and/or membership identification number. The eligibility determiner 118 can use participant data 110 and/or benefit plan data 108 to identify whether the person identified in the claim 102 is a plan participant who had an active membership to a benefit plan as of the dates of service identified in the claim 102. If the person identified in the claim 102 is not a plan participant, or their membership to a benefit plan was not active as of the dates of service identified in the claim 102, the automatic adjudication pipeline 106 can issue a claim decision 114 denying the claim 102, or route the claim 102 to a manual queue for review. However, if the eligibility determiner 118 determines that the person identified in the claim 102 is eligible for coverage because he or she had an active membership to a benefit plan as of the dates of service identified in the claim, the eligibility determiner 118 can retrieve information about that benefit plan from the benefit plan data 108, such as a code identifying the benefit plan, and provide it to later stages of the automatic adjudication pipeline 106.

The benefit categorizer 120 can be a stage of the automatic adjudication pipeline 106 that uses pipeline rules 112 to identify one or more benefits associated with the claim 102. For example, the benefit categorizer 120 can review the claim 102 for information about services rendered to the plan participant, such as procedure codes, diagnosis codes, billing codes, a provider type, patient information, provider information, a service location, and/or any other data. The benefit categorizer 120 can use this information to determine one or more benefit code or other benefit identifiers associated with the services identified by the claim 102.

In some examples, if the benefit categorizer 120 cannot identify an existing benefit code or other benefit identifier associated with services identified in a claim 102, a pend rule may be triggered as discussed below such that the claim 102 can be redirected for manual review in the user interface 116. User input received from human reviewers via the user interface 116 can be used to determine an appropriate benefit code or identifier for a service, and the benefit categorizer 120 can be reconfigured to use that benefit code or identifier for that type of service in the future. In some examples, machine learning, cluster analysis, or other predictive modeling can be used to predict a benefit code or identifier that may be associated with an unrecognized type of claim 102. In these examples, a predicted benefit code, along with an associated confidence interval in some cases, can be displayed as a recommendation in the user interface 116 when a claim 102 is redirected for manual review, such that a human reviewer can confirm that the predicted benefit code should be used for a certain type of service or provide an alternate benefit code for the service. If an alternate benefit code for a service is provided by a human reviewer, the benefit categorizer 120 can use that alternate benefit code for that service for the claim 102 and future claims 102. Machine learning for the benefit categorizer 120 can also use confirmations of predicted benefit codes and provided alternate benefit codes as training data that can lead to better predictions of recommended benefit codes. Accordingly, when the benefit categorizer 120 cannot identify an existing benefit code or identifier for a service in a claim 102, such as if no code has yet been created for that type of service or a previously-used code has expired and been removed from a database of codes, user input and/or predictive modeling can be used to reconfigure the benefit categorizer 120 so that it can find and use an appropriate benefit code for the previously unrecognized service.

The plan coverage identifier 122 can be a stage of the automatic adjudication pipeline 106 that uses pipeline rules 112 to identify coverage information associated with the identified benefit under the identified benefit plan. In other examples, instead of being a distinct stage of the automatic adjudication pipeline 106, the plan coverage identifier 122 can be considered a service or module that can be called by one or more other stages of the automatic adjudication pipeline 106 to identify coverage information associated with identified benefits under an identified benefit plan. As discussed above, the eligibility determiner 118 can have identified a particular benefit plan associated with the plan participant as of a date of service identified in the claim 102, while the benefit categorizer 120 can have identified a benefit code or other identifier associated with the services identified in the claim 102. The plan coverage identifier 122 can use that information to determine how much coverage, if any, the identified benefit plan provides for the identified benefit. For example, the plan coverage identifier 122 can use benefit plan data 108 about the identified benefit plan to determine a copayment amount or coinsurance amount associated with the identified benefit overall or with respect to one or more coverage stages. In some examples, the plan coverage identifier 122 can also use benefit plan data 108 to determine accumulator amounts associated with the identified benefit, such as information about whether the coverage amounts apply to specific deductibles and/or out-of-pocket maximums at one or more coverage stages.

The claim bundler 124 can be a stage of the automatic adjudication pipeline 106 that uses pipeline rules 112 to identify distinct episodes of care within the claim 102, or across multiple claims 102. Although one or more claims 102 may indicate that a provider rendered multiple services to a patient, when those services were provided closely together in time to treat a particular medical condition, they may be part of a single episode of care and should be adjudicated together. As one example, if one or more claims 102 reference multiple services provided during a single hospital stay for a patient, the claim bundler 124 can determine that benefits associated with those services should not be considered in isolation when adjudicating the claims 102, but should instead be adjudicated together so that the plan participant does not pay for more than the benefit plan allows for that entire episode of care. As another example, if multiple claims 102 relate to maternity care, those claims 102 can be bundled and considered together as part of a single episode of care or with respect to a single benefit of a benefit plan. In other examples, the claim bundler 124 can apply flexible or alternative pricing logic to similar types of claims over periods of time, and/or to claims 102 that originate from non-traditional provider networks.

The cost sharing determiner 126 can be a stage of the automatic adjudication pipeline 106 that uses pipeline rules 112 to determine a cost sharing arrangement for the claim 102. For example, the cost sharing determiner 126 can use coverage information determined by the plan coverage identifier 122 for an identified benefit, or a bundle of benefits associated with an episode of care identified by the claim bundler 124, to calculate how much an insurer or sponsor of the benefit plan will pay for the claim 102, and how much the plan participant will pay for the claim 102. In some examples, the cost sharing determiner 126 can consider a plan participant's current coverage stage when determining a cost sharing arrangement for a claim 102. For example, when the participant data 110 includes accumulators indicating that the plan participant has already paid a deductible amount but has not yet reached an out-of-pocket maximum, the cost sharing determiner 126 can determine that the plan participant should pay a coinsurance percentage indicated by the benefit plan data 108 that is associated with the benefit identified by the benefit categorizer 120, and that a sponsor should pay the remainder of the claim amount for that benefit. In some examples, the cost sharing determiner 126 can also determine a coordination of benefits (COB) cost sharing arrangement based on an indication of whether the administrator is a primary payer or a secondary payer of claims 102 when a plan participant also has other insurance coverage.

The pend rule evaluator 128 can be a stage of the automatic adjudication pipeline 106, or a separate module or service, that uses pipeline rules 112 to determine if a claim 102 should be redirected to the user interface 116 for manual review. As described above, the pipeline rules 112 applied during various stages of the automatic adjudication pipeline 106 can include pend rules that define manual review conditions under which a claim 102 should be redirected from the automatic adjudication pipeline 106 to the user interface 116 for manual review.

In some examples, pend rules can be associated with error conditions or policy conditions that can indicate issues with claims 102 that should be manually reviewed. For example, pend rules can be associated with data in claims 102 that may indicate upcoding, fraud, waste, or abuse, incompatible or inconsistent data in claims 102, data in claims 102 that does not correspond with benefit plan data 108 or participant data 110, claims 102 with ambiguous coding or categories, claims 102 for values over a threshold limit, issues with claims 102 that should halt automatic processing of the claims 102, and/or any other issue with a claim 102 that indicates that the claim 102 should be redirected from the automatic adjudication pipeline 106 to the user interface 116 for manual review before a final claim decision 114 is issued.

In other examples, pend rules may not directly indicate problems with claims, but can correspond to policies of the administrator, contractual agreements, business rules, industry guidelines, regulations, and/or any policy. For example, a pend rule can correspond to a business rule indicating that claims 102 having certain attributes should be redirected for manual review at the user interface 116 and/or be redirected to initiate downstream business processes, for instance redirecting a claim 102 so that providers or members associated with the claims 102 can be contacted by human reviewers or customer service personnel to enhance business relationships or obtain business intelligence. As another example, a pend rule can correspond to a contractual agreement associated with a particular benefit plan or an administrator policy indicating that claims 102 for an amount over a predetermined threshold should be manually reviewed.

In some examples, pend rules can be manually created to correspond to error conditions, policy conditions, or any other manual review condition. In other examples, pend rules can be automatically generated using machine learning, as will be discussed further below. For example, machine learning can, over time, identify issues with claims 102 that are more likely to identify fraud, waste, or abuse, and can generate pend rules that can flag claims 102 with those issues for manual review.

In some examples, pend rules can be evaluated and/or triggered during individual stages of the automatic adjudication pipeline 106, and the pend rule evaluator 128 can determine if any pend rules were triggered at earlier stages before the claim 102 reached the pend rule evaluator 128. In some examples, if a pend rule applies to the claim 102 during a particular stage, the stage can be fully or partially skipped, however later stages can still attempt to process the claim 102. For example, a pend rule may have been triggered at the benefit categorizer 120 if a claim 102 identified a service that does not correspond with a known benefit code as discussed above, however the claim 102 may still have proceeded through later stages of the automatic adjudication pipeline 106 so that data related to other services that did match a known benefit code at the benefit categorizer 120 could be processed. The pend rule evaluator 128 can also review a claim 102 that arrives after having been processed by multiple earlier stages to determine if the processed version of the claim 102 triggers any pend rules. In other examples, a pend rule may be triggered at early stages of the automatic adjudication pipeline 106 for a claim 102 due to a pipeline error that halts automatic adjudication of the claim 102 because some or all later stages would be prevented from automatically processing the claim 102. For example, if the eligibility determiner 118 cannot find participant data 110 about a patient identified by a claim 102 or cannot find a benefit plan that was active for that patient at the time services associated with the claim 102 were rendered, a pend rule may be triggered that halts further automatic processing and/or skips later stages so that the pend rule evaluator 128 can redirect the claim 102 to the user interface 116 and a manual reviewer can attempt to identify the correct patient or benefit plan.

If the pend rule evaluator 128 determines that a claim 102 triggered one or more pend rules either within any one or more stages of the automatic adjudication pipeline 106, or that the cumulative processing of the stages of the automatic adjudication pipeline 106 indicates that the claim 102 triggers one or more pend rules when the claim 102 reaches the pend rule evaluator 128, the pend rule evaluator 128 can redirect the claim 102 from the automatic adjudication pipeline 106 to the user interface 116 for manual review.

As shown in FIG. 1B, when the pend rule evaluator 128 redirects a claim 102 to the user interface 116, the automatic adjudication pipeline 106 can share data about a redirected claim 102 with the user interface 116, including original data included when the claim 102 was submitted or transformed by a claim ingestor 104, stage data 130 indicating output of one or more stages of the automatic adjudication pipeline 106 that processed the claim 102, and/or a claim alert 132 identifying the one or more triggered pend rules or one or more manual review conditions associated with the triggered pend rules.

The user interface 116 can display the data from or derived from the claim 102 and/or the automatic adjudication pipeline 106, including original data from the claim 102, stage data 130, benefit plan data 108, participant data 110, and/or a claim alert 132. In some examples, specific data and/or fields associated with conditions that triggered one or more pend rules can be flagged or otherwise highlighted in the user interface 116 such that a user can quickly identify potential issues with the claim 102. An example of a user interface 116 flagging such potentially problematic data in a claim 102 is discussed in more detail below with respect to FIG. 2.

In some examples, when a claim 102 is redirected from the automatic adjudication pipeline 106 to the user interface 116 for manual review as described herein, the automatic adjudication pipeline 106 or other component of the claim adjudication system 100 can route the claim 102 to a particular instance of the user interface 116 associated with a particular human reviewer. For example, the claim adjudication system 100 can evaluate current review queues associated with different human reviewers, and route a claim 102 to a user interface 116 for the human reviewer that has the fewest number of claims 102 to review in their review queue. Accordingly, a set of claims 102 redirected from the automatic adjudication pipeline 106 can be distributed among available human reviewers in a balanced manner. In some examples, the claim adjudication system 100 can use machine learning or other types of analyses to also consider factors including the number of available human reviewers, work schedules of individual human reviewers, historical data about average amounts of time each human reviewer takes to process claims 102, types of claims 102 that each human reviewer is most efficient at processing, types of claims 102 that each human reviewer is qualified or approved to process, and/or any other factor when determining which human reviewer should process a particular claim 102 in their instance of the user interface 116.

In some examples, the user interface 116 can be run remotely from the computing device that displays it. For instance, the user interface 116 can be a portal website that a user can access from user terminal or other computing device. In other examples, the user interface 116 can run as part of a local application on a user's device, but interface with a remote backend server of the claim adjudication system 100 to receive claim alerts 132 and other data about a claim 102 and upload user input 134 in response.

During manual review of a claim 102, a user can provide user input 134 via the user interface 116 to resolve conditions that triggered pend rules or otherwise advance adjudication of the claim 102. For example, user input 134 can edit claim data or provide an override instruction indicating that a condition that triggered a pend rule should not apply to the claim 102. As will be described below with respect to FIG. 2, the user interface 116 can present comprehensive information about the claim 102, such that the user can access multiple types of information that may be needed to manually review the claim and resolve conditions that triggered a pend rule. However, in some examples the user interface 116 may have a messaging interface or other communication mechanism that allows the user to contact the provider that originated a claim 102, a subscriber associated with the claim 102, or any other external entity who may be able to provide additional information about the claim 102 that may be needed to resolve the conditions that triggered a pend rule.

In some examples, after a user provides user input 134 to resolve conditions that triggered pend rules, the claim 102 can be redirected back to the automatic adjudication pipeline 106, where it can begin automatic adjudication again at the first stage of the automatic adjudication pipeline 106 based on edited data. During this repeated pass through the automatic adjudication pipeline 106, some individual stages can be skipped, such as if the edited data is only relevant to one or more certain stages and other stages would repeat the same analysis of the claim that they have already performed. In other examples, if the user input 134 is sufficient to fully adjudicate the claim 102 and output a claim decision 114, the claim decision 114 can be sent to a database of adjudication results 136 and/or other recipients without returning the claim 102 to the automatic adjudication pipeline 106.

As shown in FIG. 1B, user input 134 provided in response to triggered pend rules and redirection of claims 102 from the automatic adjudication pipeline 106 to the user interface 116 can also be provided to a pipeline rule manager 138. Stage data 130 indicating how one or more stages of the automatic adjudication pipeline 106 have automatically processed claims 102 can also be provided to the pipeline rule manager 138.

The pipeline rule manager 138 can apply statistical inference models, machine learning, and/or other processing or artificial intelligence to manage pipeline rules 112, including the adjudication rules and pend rules described above. For example, the pipeline rule manager 138 can use statistical inference models or machine learning to review pipeline rules 112, change pipeline rules 112, and/or create new pipeline rules 112. The pipeline rule manager's management of pipeline rules 112 can be based on a priori statistical modeling, expert knowledge modeling with logical rules or probabilistic conditions, or on-line empirical learning via A/B testing and/or any other type of artificial intelligence or machine learning, such as statistical regression, Markov modeling, or neural networks.

In some examples, the pipeline rule manager 138 can use current and/or historical information about how claims 102 have been processed by the automatic adjudication pipeline 106 and/or via manual review to learn about claim types and identify outliers that should be held and/or reviewed manually. For example, statistical inference models can use current and/or historical claim information to identify types of outlier claims 102 that should be manually reviewed even if the stages of the automatic claims adjudication pipeline 106 would otherwise be able to process those claims 102 without error. As an example, statistical inference models or other machine learning can be configured to detect claims 102 that are likelier than others to be associated with fraud, waste, or abuse, or other anomalies. For instance, if claims 102 from a certain provider used to be flagged as in-network but are now being flagged as out-of-network, machine learning can detect the sudden change in how claims 102 from the provider are being processed and redirect those claims 102 to manual review so that the cause of the change can be investigated. Accordingly, in some examples, the pipeline rule manager 138 can use statistical inference models to generate new pend rules that cause such outlier claims 102 to be redirected for manual review even if they could be handled by existing adjudication rules. In other examples, the pipeline rule manager 138 can use statistical inference models to identify types of outlier claims, and create or adjust pipeline rules 112 used at one or more stages so that similar outlier claims can be recognized at those stages and be redirected for manual review.

Statistical inference models can also be used to identify types of claims 102 that should be redirected or held for plan exceptions or to initiate downstream business processes. For example, statistical inference modeling can cause a certain type of claim 102 to be routed away from the automatic adjudication pipeline 106 to a customer service queue so that more information can be gathered from a provider or member directly, cause a claim 102 to be held in the automatic adjudication pipeline 106 to streamline reimbursement, or predict and flag claims 102 that may be appealed.

Although statistical inference models can be used in the pipeline rule manager 138 to create or adjust pipeline rules 112, in other examples, statistical inference models can be used directly within one or more stages of the automatic adjudication pipeline 106, at the claim ingestor 104, and/or at any other element of the claim adjudication system 100. For example, statistical inference models can be used directly within a stage of the automatic adjudication pipeline 106 to identify types of outlier claims 102 and/or flag outlier claims 102 for redirection to the manual review user interface 116 or to a hold queue, even if existing pend rules would not otherwise redirect those claims 102. As another example, as discussed above, statistical inference models or other machine learning can be used at the benefit categorizer 120 to predict recommended benefit codes when an existing code for a service cannot be found. As yet another example, statistical inference models or other machine learning can be used within the claim bundler 124 to help identify distinct episodes of care within one or more claims 102. In still other examples, statistical inference models or other machine learning may be used at any stage to predict or infer content that is missing from a claim 102, such as by using data from previous similar claims 102 that corresponds to the missing data in the current claim 102, and use that inferred content to continue automatically adjudicating the claim 102 if a confidence metric about the inferred content is above a threshold.

In some examples, the pipeline rule manager 138 can use user input 134 from the manual review user interface 116 and/or stage data 130 from the automatic adjudication pipeline 106 as training data for machine learning algorithms, such that the pipeline rule manager 138 can adjust pipeline rules 112 over time as additional user input 134 and/or stage data 130 is received. For example, if a particular pend rule consistently causes a certain type of claim 102, such as claims 102 that include a particular type of benefit, to be redirected to the user interface 116 for manual review due to a particular manual review condition, but user input 134 consistently includes override instructions indicating that the particular pend rule should not apply to that type of claim 102 or type of benefit, the pipeline rule manager 138 can learn over time that the particular pend rule should not apply to that type of claim 102 or benefit. The pipeline rule manager 138 can accordingly adjust the pipeline rules 112 so that the pend rule evaluator 128 no longer redirects that type of claim 102 or claims with that type of benefit to the user interface 116 based on that particular pend rule.

As another example, if a particular pend rule consistently causes claims 102 containing a particular type of error or condition to be redirected to the user interface 116 for manual review, and user input 134 consistently edits the claims 102 in a particular way to correct that type of error or condition, the pipeline rule manager 138 can learn over time how to adjust adjudication rules to avoid needing such edits. For example, if adjudication rules used by the benefit categorizer 120 cannot find a benefit that matches a new type of service, but over time user input 134 indicates that the new service should be adjudicated with respect to a particular benefit, the pipeline rule manager's machine learning can adjust the benefit categorizer's adjudication rules so that future claims 102 identifying that new service are automatically adjudicated based on that particular benefit without needing to redirect the claims to the user interface 116 due to an unrecognized benefit.

The pipeline rule manager's machine learning, including statistical inference models in some examples, may also, over time, adjust pipeline rules 112 to better detect claims 102 associated with fraud, waste, abuse, or other anomalous elements or serious problems. For example, the pipeline rule manager 138 can learn over time which types of claims 102, and/or which types of attributes of claims 102, are flagged as being associated with fraud, waste, and abuse, and generate or modify pend rules such that similar claims 102 are redirected for manual review in the future. As such, the pipeline rule manager's machine learning can adjust pipeline rules 112 to better detect such serious problems with claims 102 that should be manually reviewed.

As described above, the pipeline rule manager's machine learning can automatically adjust pipeline rules 112 based on past stage data 130 and/or user input 134 to better handle issues with claims 102 automatically without needing manual review, and/or learn to redirect claims 102 to the user interface 116 that are more likely to contain serious problems. Accordingly, the pipeline rule manager's machine learning can, over time, cause fewer claims 102 to be redirected to the user interface 116 for manual review and increase the percentage of claims 102 that can be fully adjudicated automatically. This can increase the average speed at which claims 102 are processed, as well as decreasing the amount of computing resources needed to display the user interface 116 relative to displaying the user interface 116 for every problematic claim 102. This can also decrease the workload on human claims adjustors. In addition to fewer claims 102 needing manual review overall, the surfacing of information associated with why a particular claim 102 was redirected to the user interface 116 can also draw a human claims adjustor's attention to specific aspects of the claim 102 that should be reviewed, which can increase the average speed at which human user can review the claim 102 and increase the user's efficiency.

In some examples, the pipeline rule manager 138 may use machine learning, including statistical inference models in some cases, as described above to generate suggestions for new or adjusted pipeline rules 112, and output those suggestions to users for manual review. The users may then review the new or adjusted pipeline rules 112 suggested by the pipeline rule manager 138, determine whether to approve them, and cause approved pipeline rules 112 to be loaded into the automatic adjudication pipeline 106 to be implemented. In other examples, new or adjusted pipeline rules 112 generated by the pipeline rule manager 138 can be directly implemented by the automatic adjudication pipeline 106 without waiting for human approval. In another example, the pipeline rule manager 138 can aggregate pend rules accumulated across discrete benefit plans and generate suggestions for improvements to benefit plans.

In some examples, in addition to using machine learning to automatically manage pipeline rules 112 based on user input 134 provided to the user interface 116 to adjudicate claims 102, such as user input 134 that edits claim data or overrides triggered pend rules, the pipeline rule manager 138 can also allow users to manually review or edit pipeline rules 112. For example, a user can use the pipeline rule manager 138 to manually create a new pipeline rule 112 reflecting a new claims adjudication policy, which can then be applied by the automatic adjudication pipeline 106. In some examples, the pipeline rule manager 138 can then use machine learning based on stage data 130 and/or user input 134 to automatically adjust that new pipeline rule 112 over time.

In some examples, the pipeline rule manager 138 can use stage data 130 and/or user input 134 with respect to a claim 102 related to earlier stages of the automatic adjudication pipeline 106 to automatically manage pipeline rules 112, even if that claim 102 was redirected to the user interface 116 based on pend rules triggered at later stages or after reaching the pend rule evaluator 128. For example, if a claim 102 passed successfully through most of the stages of the automatic adjudication pipeline 106, but triggers a pend rule at the final cost sharing determiner 126 stage, the pipeline rule manager 138 may use stage data 130 indicating how the earlier stages processed the claim 102 to evaluate and/or alter pipeline rules 112. Accordingly, even if the claim 102 is not manually reviewed via the user interface 116 for a few weeks after the claim 102 was redirected from the automatic adjudication pipeline 106, the pipeline rule manager 138 can manage pipeline rules 112 based on stage data 130 from stages that were already able to process the claim 102, without waiting for the claim 102 to be fully adjudicated.

As shown in FIGS. 1A and 1B, a claim decision 114 can be output by the automatic adjudication pipeline 106 or the user interface 116. A claim decision 114 can indicate whether the claim 102 was approved or denied, the calculated cost sharing arrangement, and/or how much is to be applied to accumulators. In some examples, a claim decision 114 can indicate whether a claim 102 was approved or denied at granular levels, such as indicating whether one or more lines or services of the claim 102 were approved while other lines or services were denied.

In some examples, if a claim 102 passed successfully through all of the stages of the automatic adjudication pipeline 106 without triggering pend rules, the automatic adjudication pipeline 106 can output a claim decision 114 based how the claim 102 was processed by the individual stages of the automatic adjudication pipeline 106. In other examples, if a claim 102 was redirected to the user interface 116, and user input 134 was entered that led to a fully adjudicated claim, the claim decision 114 can be output from the user interface 116. In still other examples, if a claim 102 was redirected to the user interface 116, user input 134 was entered to resolve an issue associated with a triggered pend rule, the claim 102 was returned to the automatic adjudication pipeline 106, and the claim 102 passed through the automatic adjudication pipeline 106 successfully based on edited data or modified pipeline rules 112, the automatic adjudication pipeline 106 can output a claim decision 114.

As shown in FIG. 1B, a claim decision 114 can be stored in a database of adjudication results 136 and/or shared with the provider that submitted the claim 102, the plan participant, a plan sponsor, and/or any other authorized entity. In some examples, the claim adjudication system 100 can include an automated communication mechanism that automatically informs one or more stakeholders, such as providers, members, plan participants, networks, and/or other entities about a claim decision 114. A claim decision 114 can also be used to update participant data 110. For example, when a claim decision 114 indicates that the plan participant is to pay a $30 copay for a service, accumulators in the participant data 110 associated with out-of-pocket maximums can be increased by $30.

As discussed above, statistical inference models or other machine learning can be used to create or adjust pipeline rules, or be used directly within one or more stages of the automatic adjudication pipeline 106. While in some examples such statistical inference models or other machine learning can be used to identify claims 102 that should be redirected to the user interface 116 for manual review, or to a hold queue, in other examples statistical inference models or other machine learning can also be used to evaluate current and/or historical data about claims that have passed through the automatic adjudication pipeline 106 to provide feedback on benefit plans. For example, statistical inference models can provide insights that can be used when designing future benefit plans, such as plan design recommendations produced by statistical inference models based on data about previously submitted claims 102 and how those claims 102 have adjudicated, including stage data 130 and adjudication results 136.

In other examples, statistical inference models or other machine learning can be used to identify claims 102 that should be routed to the automatic adjudication pipeline 106 initially. For example, the claim ingestor 104 can use statistical inference models based on current and/or historical claim data to identify when a newly received claim 102 is not a recognized type of outlier claim 102 that should go directly to manual review, and can therefore route the claim 102 to the automatic adjudication pipeline 106. Thus, an improved experience can be provided to members, providers, and/or other entities with respect to claims repricing, reimbursement, and other issues.

As an example, statistical inference models or other machine learning can be used to assign a risk score to one or more claims 102 received from the claim ingestor 104, and claims 102 with risk scores higher than a threshold can be routed directly to the user interface 116 or an alternate automatic adjudication system while claims 102 with risk scores below the threshold can be routed to the automatic adjudication pipeline 106 as described above. Risk scores can be associated with single claims 102, with files or sets of claims 102 that are associated with each other, with providers that submit claims 102, and/or with payment integrity predictions. The risk scores can be assigned based on detecting anomalies that may not prevent claims 102 from being automatically adjudicated, but indicate that the claims 102 should be manually reviewed or directed to another type of adjudication queue. For example, a set of 75 claims 102 regarding ambulance services may have a statistically larger difference between the billed amount and an allowed amount than is expected, and/or have an unexpected value distribution in which miles traveled by the ambulances were less than a mile whereas most claims 102 for ambulance services indicate travel distances between one and 150 miles. Accordingly, in this example statistical inference models or other machine learning can detect the anomalies associated with this set of claims and prevent them from being routed through the automatic adjudication pipeline 106 so that the anomalies can be investigated manually or through alternate automated systems.

FIG. 2 depicts an example presentation of a user interface 116 for manually reviewing a claim 102. The example user interface 116 of FIG. 2 shows data about a claim 102 that has been redirected from the automatic adjudication pipeline 106 to the user interface 116 due to one or more triggered pend rules. The user interface 116 can display adjudication rules and errors 202, claim overview data 204, participant data 206, provider data 208, incident data 210, diagnosis data 212, claims table 214, accumulator data 216, and/or any other information. The user interface 116 can also display selectable adjudication options 218, such as options to save changes to a claim 102 and return it to the automatic adjudication pipeline 106, deny a claim 102, route a claim 102 into a pend queue, or to pay the claim 102 and issue a claim decision 114 based on current information about the claim 102. In some examples, the user interface 116 may also allow a user to send a message to the provider that submitted the claim 102, the plan participant, the sponsor, or any other entity, such as a message asking the provider for more information that may help the user to evaluate the claim 102 or to edit the claim 102.

Generally, a user may need to view several types of data while processing a claim 102, including information about the claim 102, the benefit plan, the patient's individual information and claim history, such as the current status of various accumulators, other allowable limits related to specific elements of the claim 102, and/or other information. The user interface 116 described herein can display some or all of these several types of data such that they are visible at the same time and are all directly accessible and visible from the same source in the same application. For example, the adjudication rules and errors 202, claim overview data 204, participant data 206, provider data 208, incident data 210, and/or diagnosis data 212 can be displayed in a sidebar, such as a scrollable sidebar, while the claims table 214 and/or accumulator data 216 can be displayed in a larger area of the user interface 116. This can allow the information in the sidebar to remain visible while a user views and/or edits claims table 214 and/or accumulator data 216. Accordingly, a user may not need to open other windows or programs to view other types of data while processing a claim 102, which can improve the speed of a user's navigation through the user interface 116 relative to other claim adjudication systems that do not present several types of data in the same view of an integrated user interface 116. Additionally, the integrated user interface 116 described herein can reduce required computing resources relative to conventional systems. For example, the user interface 116 described herein can require fewer processor cycles and use less memory to display and use, relative to conventional systems in which require users to open multiple windows and/or applications to view different data sources while evaluating a single claim 102.

The adjudication rules and errors 202 section of the user interface 116 can identify pend rules or associated conditions indicating why the claim 102 was redirected from the automatic adjudication pipeline 106 to the user interface 116 for manual review. In some examples, the adjudication rules and errors 202 section can display information related to a claim alert 132. For example, the adjudication rules and errors 202 can display messages such as "claims over $2000 require manual review" indicating that a pend rule was triggered due to a policy condition specifying that claims 102 submitted for over $2000 should be diverted to the user interface 116, or "no benefit match" indicating that a pend rule was triggered due to an error condition in which a billing code in the submitted claim 102 did not match a known benefit of a benefit plan at the benefit categorizer 120. In some examples, the adjudication rules and errors 202 section, or any other section of the user interface 116, can display a risk score associated with the claim 102 that was assigned based on machine learning when the claim 102 or a set of claims 102 was received from the claim ingestor 104. Accordingly, even if the assigned risk score was low enough that the claim 102 was routed through the automatic adjudication pipeline 106 initially, the risk score can be displayed in the user interface 116 to assist a manual reviewer in understanding potential issues with the claim 102.

Accordingly, by surfacing information related to why a claim 102 was redirected from the automatic adjudication pipeline 106 to the user interface 116 for manual review, the adjudication rules and errors 202 section of the user interface 116 can assist a user in understanding what about a particular claim 102 should be reviewed, likely reducing the time it takes for the user to process the claim 102 relative to other systems that do not provide such contextual information about why claims 102 were not automatically reviewed. Reducing the period of time during which a claim 102 is displayed within the user interface 116 can reduce the processor cycles, memory, and/or other computing resources associated with operating the user interface 116.

In some examples, the adjudication rules and errors 202 section can indicate that a claim 102 was redirected to initiate a downstream business process. For example, the adjudication rules and errors 202 section may indicate that a particular claim 102 was redirected to the user interface 116 based on a business rule indicating that the provider who submitted the claim 102 should be contacted by a customer service representative. Accordingly, a user of the user interface 116 can either perform that downstream business process directly with respect to the claim 102, or redirect the claim to a customer service database or other element associated with the downstream business process. In some examples, user input 134 provided with respect to the downstream business processes can be used as training data for machine learning, as described herein.

The claim overview data 204 section of the user interface 116 can display various types of information about the claim 102, such as a claim number, dates of service, a provider type, name, and/or location, a network associated with a particular benefit plan associated with the claim 102, whether the provider is an in-network or out-of-network provider with respect to that network, and/or any other information. In some examples, the claim overview data 204 can also display information about related or associated claims 102, such as claims 102 that have been bundled together as part of the same episode of care or claims 102 associated with the same plan participant and/or types of service. The claim overview data 204 can be drawn from the claim 102, benefit plan data 108, databases about providers, and/or other sources.

The participant data 206 section of the user interface 116 can display information about one or more plan participants associated with the claim 102, such as a subscriber to an insurance plan and/or other plan participants covered by the insurance plan. For example, the participant data 206 section can display a patient's name, date of birth, age, sex, and/or other patient information, a benefit plan identifier, a benefit plan sponsor, benefit plan membership dates, a subscriber name, a subscriber identifier or membership number, relationship to the subscriber, information about other types of coverage the participant is known to have, and/or any other information. In some examples, data displayed in the participant data 206 section can be drawn from the claim 102 and/or participant data 110.

The provider data 208 section of the user interface 116 can display information about providers associated with the claim 102. For example, the provider data 208 section can display the provider's name, the provider's contact information, a provider type, a provider identification number, and/or any other information. In some examples, information about multiple providers associated with a claim 102 can be displayed in the provider data 208 section, for instance if the claim 102 is associated with a service provider such as a doctor or doctor's office as well as a billing provider the service provider uses for billing services.

The incident data 210 section of the user interface 116 can display information about an incident related to the claim 102. For example, for a claim related to a hospital visit, the incident data 210 section can display an admission date, a discharge date, a type of bill for the hospital visit, prior authorization data, and/or any other type of information.

The diagnosis data 212 section of the user interface 116 can display information about one or more diagnoses that have been made in relation to the claim 102. For example, the diagnosis data 212 section can have a code and/or description of one or more diagnoses associated with the claim 102, for example a first diagnosis of "premature rupture of membranes" and a second diagnosis of "ulcerative colitis."

In some examples, a user can optionally select any of the adjudication rules and errors 202, claim overview data 204, participant data 206, provider data 208, incident data 210, or diagnosis data 212 in the sidebar to change the user interface 116 to display additional information about any of those sections. For example, a user may be able to click on the participant data 206 to view a patient information screen that displays additional information about the patient, such as a history of previous claims 102 associated with the patient, contact information for the patient, and/or any other information about the patient. However, although a user may be able to optionally select particular data categories to view additional information about those categories, the most relevant information that a user is likely to want to view while manually reviewing a claim 102, such as the adjudication rules and errors 202, claim overview data 204, participant data 206, provider data 208, incident data 210, diagnosis data 212, claims table 214, and/or accumulator data 216 can be shown in a main presentation of the user interface 116 as shown in the example of FIG. 2. Accordingly, a user can use the main presentation of the user interface 116 to view and/or edit the most relevant information about a particular claim 102 without drilling down to additional details in individual categories of information. In some examples, the claim adjudication system 100 can track how users use the user interface 116 and what types of data they most often choose to view, and use machine learning to determine a default view for the user interface 116 that initially presents the most commonly accessed types of data but allows users to drill down into more detailed information that is less commonly accessed.

The claims table 214 section of the user interface 116 can display a table of information related to the services identified in the claim 102. For example, if a claim 102 included multiple billing codes or other identifiers associated with different services, the claims table 214 may have lines for each of those services.

Each line of the claims table 214 can include different types of information, include dates of service, a billing code or other identifier for a service, a benefit name, a billed amount, an allowed amount, a plan payment amount, a member payment amount, notes about the service entered by the provider, the automatic adjudication pipeline 106, or users of the user interface, and/or any other information. For example, a line for a service may display information submitted in the claim 102 by a provider, such as a date of service, a billing or diagnosis code, and a billed amount. As the claim 102 may have successfully progressed through one or more stages of the automatic adjudication pipeline 106 despite triggering one or more pend rules, the line for the service may also use stage data 130 to display information determined by the automatic adjudication pipeline 106, such as a name of a benefit found by a benefit categorizer 120 to match the service identifier submitted by the provider, a maximum amount permitted by a benefit plan to be paid for that benefit, and/or cost sharing information determined by the cost sharing determiner 126, such as a plan payment amount and a member payment amount.

The claims table 214 section may also have a totals area in which total values across all of the lines of the claim table 214 are displayed. For example, the totals area may display totals, based on the current claim data displayed in the claims table 214, for how much was originally billed, how much of a discount is currently applied, how much is currently noted as being allowed, how much is currently denied, the value of a current copay amount, the value of a current deductible amount, the value of a current co-insurance amount, how much is currently not covered, and/or totals of how much the plan will pay and how much the member will pay based on the current values in the claims table 214. As will be discussed below, a user can use the user interface 116 to edit information in the claims table 214, and the totals area can update to reflect any changes to the information in the claims table 214 based on such editing.

The accumulator data 216 section of the user interface 116 can display a preview of how accumulators associated with the plan participant, such as a subscriber to the benefit plan or dependents of the subscriber, in participant data 110 would be affected based on the current information in the claims table 214. For example, for a particular accumulator for a deductible or out-of-pocket maximum, the accumulator data 216 section can display a graphical and/or numeric depiction that shows an amount already applied to the accumulator, an indication of an additional amount that would be applied to the accumulator if the current values in the claims table 214 were approved, and/or a depiction of how those values relate to a total permissible amount associated with the accumulator. If a user edits the data in the claims table 214, the previews in the accumulator data 216 section can be updated based on such editing.

As discussed above, a claim 102 can be redirected from the automatic adjudication pipeline 106 to the user interface 116 when the pend rule evaluator 128 determines that the claim 102 triggers one or more pend rules. In this situation, a claim alert 132 or other conditions or information associated with the pend rules can be displayed in the adjudication rules and errors 202 section of the user interface 116. In addition, one or more lines of the claims table 214 that are associated with conditions that triggered the pend rules can be displayed as flagged lines 220 displayed in a format likely to draws a user's attention to those flagged lines 220. For example, a flagged line 220 can be highlighted, outlined, bolded, shown in a different color or with a different background, and/or be displayed with any other visibly noticeable formatting.

FIG. 2 depicts an example in which some lines of the claims table 214 are flagged lines 220 that may be highlighted because the benefit categorizer 120 was unable to find a benefit of a patient's benefit plan that matched a billing code submitted in the claim 102 by the provider, or because the benefit categorizer 120 found multiple benefits of a patient's benefit plan that matched a billing code submitted in the claim 102 by the provider. Pend rules can have specified that the claim 102 be redirected to the user interface for manual review in such situations, such that a human reviewer can evaluate the claim to determine the correct benefit to use when adjudicating the claim 102. In some examples, the user interface 116 may display a recommended benefit suggested by machine learning predictions even though the benefit categorizer 120 could not determine the correct benefit to use, and the user can either accept that recommended benefit or provide another benefit that should be used instead to adjudicate the claim 102.

A user can use the visual formatting of a flagged line 220 to quickly identify information in the claims table 214 related to reasons why the claim 102 was redirected from the automatic adjudication pipeline 106 to the user interface 116 for manual review. Accordingly, by surfacing information related to why a claim 102 was redirected from the automatic adjudication pipeline 106 to the user interface 116 for manual review, a flagged line 220 can assist a user in understanding what about a particular claim 102 should be reviewed, likely reducing the time it takes for the user to process the claim 102 relative to other systems that do not provide such contextual information about why claims 102 were not automatically reviewed. Reducing the period of time during which a claim 102 is displayed within the user interface 116 can reduce the processor cycles, memory, and/or other computing resources associated with operating the user interface 116.

If a user selects a line of the claims table 214, such as by clicking on a line, an edit panel 222 can be displayed in the user interface 116 that allows the user to provide user input 134 to manually edit claim data associated with the selected line. The edit panel 222 may present context-relevant information related to the information the user selected, as well as fields or other data entry options that allows the user to add data, delete data, or change data associated with the claim 102. Although FIG. 2 depicts a user selecting a flagged line 220, the user interface 116 may also allow users to select any other line of the claims table 214 to bring up a corresponding edit panel 222.

In some examples, the edit panel 222 can be displayed at a location proximate to the selected line, such as directly below a selected flagged line 220 as shown in FIG. 2. In some examples, the edit panel 222 may expand within the user interface 116 such that other lines of the claims table 214 slide down to create space for the edit panel 222. In other examples, the edit panel 222 may be presented as a pop-up panel on top of other lines of the claims table 214, within the same user interface 116. In still other examples, an edit panel 222 can be presented in a dedicated area of the user interface 116 or at any other location of the user interface 116.

Displaying the edit panel 222 within the same user interface 116 as a selected line, such as directly below the selected line, can improve the speed of a user's navigation through the user interface 116 relative to other claim adjudication systems that require other screens to be opened to edit information about a claim 102. Claims 102 can therefore be edited quickly by selecting a line to bring up an edit panel 222, reviewing and/or changing information within the edit panel 222, and then closing the edit panel 222, all within the same integrated user interface 116. This can reduce required computing resources, such as using fewer processor cycles and using less memory, relative to conventional systems that handle claim editing in separate distinct windows and/or applications.

In some examples, when a user selects a particular field of a line of the claims table 214, the edit panel 222 can display editable fields and/or other information relevant to the selected field. For example, FIG. 2 shows an edit panel 222 displayed after a user has selected the benefit name field of a flagged line 220 indicating that multiple benefits of a benefit plan matched a billing code submitted by a provider. In this example, the edit panel 222 can display a field that accepts user input 134 to designate a particular benefit to use when adjudicating the claim 102 with respect to that billing code. In some examples, the field can be a text field. In other examples, the field can be a drop-down menu of selectable benefits or any other type of benefit selector. The edit panel 222 may also display information about a current choice entered into the field, such as a descriptor and cost-sharing information associated with a currently selected benefit, which can assist the user in choosing the appropriate benefit for the line.

As another example, if the user selected one of the cost-sharing fields of a line in the claims table 214, the edit panel 222 can have fields allowing the user to enter new values and/or edit current values related to those cost-sharing fields, such as manually entering values for copayment, deductible, or co-insurance amounts that should apply to the selected line. In this example, the edit panel 222 may also display information about remaining amounts that can be applied to related accumulators, similar to information displayed in the accumulator data 216 section, and/or data about a benefit that can assist the user in choosing appropriate values for the cost-sharing fields in the line.

In some examples, the user interface 116 may display, in an edit panel 222 or elsewhere, suggested changes to fields based on recommendations generated by statistical inference modeling or other machine learning. For example, based on historical information about similar types of claims 102, machine learning predictions can be made about how the claim data may be edited. Accordingly, users may be able to accept such recommendations to edit a claim 102, or enter their own edits to the claim 102 in an edit panel 222. In some examples, the user interface 116 may initially display a re-routed claim 102 with one or more suggested changes highlighted, and present a selectable option to accept all of the suggested changes that a user can select with one click or other user input if desired. These types of edit recommendations generated by machine learning may assist with reducing the period of time during which a claim 102 is displayed within the user interface 116, and in turn reduce the processor cycles, memory, and/or other computing resources associated with operating the user interface 116.

An edit panel 222 can also have a notes field that allows the user to enter text associated with the line, such as an explanation of why they edited the line. In some examples, the edit panel 222 can allow a user to address a note to another user so that the other user can be notified in their instance of the user interface 116 and have an opportunity to review the edited claim 102. For instance, a junior reviewer can tag a note in the edit panel 222 with a username for a supervisory reviewer, which can flag the claim 102 so that the tagged supervisory reviewer can later use the user interface 116 to review the junior reviewer's edits to the claim 102 and make any further edits if necessary. The edit panel 222 may also allow users to flag their reviews of a claim 102, including any newly edited data, to be approved by a supervisor or other user, to flag a claim 102 for anomalies that should be reviewed by another user, or otherwise flag a claim 102 for further collaborative review with other users. In some examples, if a claim 102 is next routed to a supervisor or other reviewer who uses the same or a similar user interface 116 to review changes to claims 102, the user interface 116 can highlight edits to a claim 102 that were made by other users. Highlighting changes that have been made to a claim 102 can allow the reviewer to quickly determine what information needs to be reviewed and approved or denied before returning the claim 102 to the automatic adjudication pipeline 106, which can reduce the period of time during which the claim 102 is displayed within the reviewer's instance of the user interface 116, in turn reducing processor cycles, memory, and/or other computing resources associated with operating the user interface 116.

In some examples, if a flagged line 220 is displayed in the claims table 214 due to a particular pend rule, but the manual reviewer determines that the claim line should not have been flagged due to that pend rule or an associated condition, the user can use an edit panel 222 or other element of the user interface 116 to provide an override instruction indicating that the pend rule should not apply to the claim 102. In other examples, if a claim 102 is redirected to the user interface 116 due to a triggered pend rule and a user does not edit any information before approving the claim or sending it back to the automatic adjudication pipeline 106, the claim adjudication system 100 can consider that action to be an implicit override instruction indicating that the pend rule should not apply to the claim 102. Such explicit or implicit override instructions can be examples of user input 134 that can be reviewed via machine learning at the pipeline rule manager 138, as described above.

After manually reviewing a claim 102 via the user interface 116, and optionally editing information about the claim 102 as discussed above, a user can select an adjudication option 218 to save the claim 102 and return the claim 102 to the automatic adjudication pipeline 106 to be re-evaluated based on edited data and/or override instructions, approve or deny the claim 102 entirely or partially, or route the claim 102 to other pend review queues.

If the user selects an adjudication option 218 to approve or deny the claim 102 entirely or partially, that decision can be output to a database of adjudication results 136 and/or other destinations.

If the user selects an adjudication option 218 to save the claim 102, the claim 102 can be returned to the first stage of the automatic adjudication pipeline 106 to be re-processed based on newly edited information or override instructions For example, if a claim 102 was redirected to the user interface 116 due to an unknown billing code that did not match a known benefit of a benefit plan at the benefit categorizer 120 stage, a user can edit the claim 102 via the user interface 116 to manually add an appropriate benefit for that billing code and then click "SAVE" in the adjudication options 218. The claim 102 can then be returned to the automatic adjudication pipeline 106 where, due to the user input 134 that added the appropriate benefit, the claim 102 can progress through the automatic adjudication pipeline 106 and be automatically adjudicated at later stages based on the benefit identified by the user. In some cases, if edits to a claim 102 or override instructions would not alter how one or more particular stages would process the claim, those stages can be skipped as the claim 102 passes through the automatic adjudication pipeline 106 again.

User input 134 provided via the user interface 116 with respect to a claim 102 can also be provided to the pipeline rule manager 138, for example when the user finishes with the claim 102 and selects an adjudication option 218. For example, if a user provides user input 134 that edits information in any lines of the claims table 214, or provides explicit or implicit override instructions associated with a pend rule, the pipeline rule manager 138 can use that user input 134 to analyze and adjust pipeline rules 112 based on machine learning as discussed above. For example, any user input 134 provided during manual review of a claim 102 at the user interface 116 can be used as training data for machine learning at the pipeline rule manager 138 to update the adjudication rules and/or pend rules used within the automatic adjudication pipeline 106. Accordingly, over time the claim adjudication system 100 can learn from provided user input 134 how to process a greater percentage of claims automatically and cause fewer claims 102 to be redirected to the user interface 116 for manual review.

Figure 3:
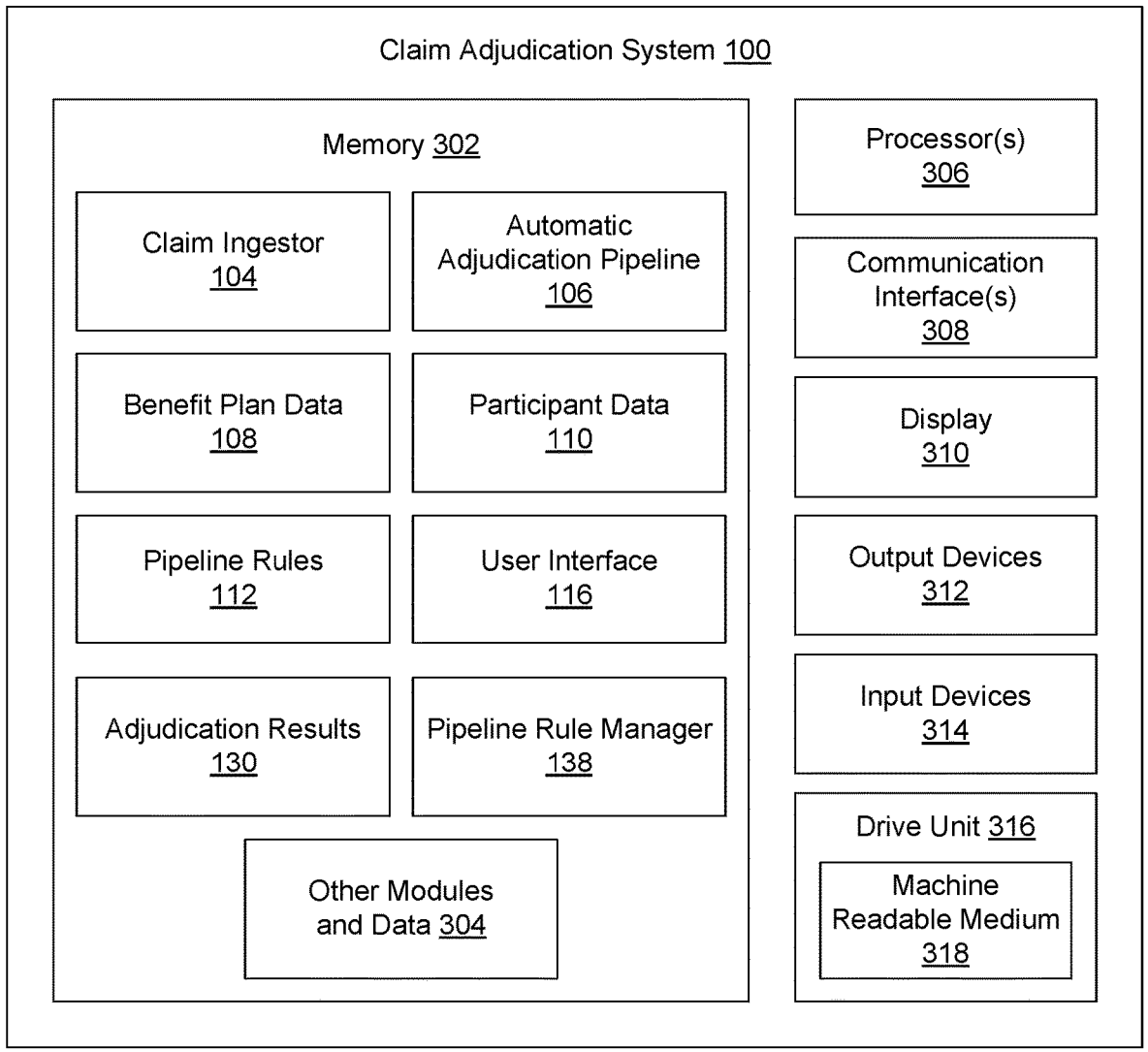
FIG. 3 illustrates an example system architecture for computing devices that can implement a claim adjudication system.

As described above, the claim adjudication system 100 can be used to automatically and/or manually adjudicate claims 102. Although the components discussed above with respect to FIGS. 1-3 can be part of a standalone claim adjudication system 100, some of all elements of the claim adjudication system 100 can also be integrated with other systems. For example, an application programming interface (API) can be provided that allows the claim adjudication system 100 to be integrated with a customer service database. For instance, a customer service representative may be able to use the user interface 116 of the claim adjudication system 100, or a separate user interface of a customer service system that can access the claim adjudication system 100 via a web API, to access data about a redirected claim 102 along with other data from customer service database. The customer service representative may then be able to contact a provider or member associated with a redirected claim 102 when the claim 102 was redirected in order to initiate a downstream business process. Example Architecture FIG. 3 illustrates an example system architecture for computing devices that can implement a claim adjudication system 100. Although FIG. 3 depicts elements of a claim adjudication system 100 together, in some examples any or all of the elements shown in FIG. 3 can be distributed among multiple computing devices, such as multiple servers. For instance, in some examples the claim ingestor 104, automatic adjudication pipeline 106, benefit plan data 108, participant data 110, pipeline rules 112, user interface 116, adjudication results 136, and/or pipeline rule manager 138 can be stored and/or operated by different computing devices. In some examples, individual stages of the automatic adjudication pipeline 106 can also be stored and/or operated by different computing devices that are in communication with one another. In some examples, a backend for the user interface 116 described herein can be operated by a computing device such as the one shown in FIG. 3, but the user interface 116 can be displayed on a separate user device such as a workstation, laptop, or mobile device.

As shown in FIG. 3, the one or more computing devices for the claim adjudication system 100 can include memory 302 that stores data for one or more of the claim ingestor 104, automatic adjudication pipeline 106, benefit plan data 108, participant data 110, pipeline rules 112, user interface 116, adjudication results 136, and/or pipeline rule manager 138 described above, as well as other modules and data 304. The one or more computing devices can also include processor(s) 306, communication interfaces 308, displays 310, output devices 312, input devices 314, and/or drive units 316 that include a machine readable medium 318.

In various examples, memory 302 can include system memory, which may be volatile (such as RAM), non-volatile (such as ROM, flash memory, etc.) or some combination of the two. Memory 302 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store desired information and which can be accessed by the claim adjudication system 100. Any such non-transitory computer-readable media may be part of the claim adjudication system 100.

Memory 302 of one or more computing devices of the claim adjudication system 100 can store code, such as computer-executable instructions, for the claim ingestor 104, one or more stages of the automatic adjudication pipeline 106, including a pend rule evaluator 128 as a stage of the automatic adjudication pipeline 106 or separate element outside the automatic adjudication pipeline 106, the user interface 116, and/or the pipeline rule manager 138 described above. The memory 302 of one or more computing devices of the claim adjudication system 100 can store other types of data, such as databases of benefit plan data 108, participant data 110, pipeline rules 112, and adjudication results 136. The memory can further store other modules and data 304 that can be used to perform or enable performing any other action taken by the claim adjudication system 100. The other modules and data 304 can include a platform and applications associated with the claim adjudication system 100, such as operating systems, and data utilized by the platform and applications. For example, the other modules and data 304 can include computer-executable instructions for determining discrepancies between submitted claims 102 and associated invoices, assigning risk scores to one or more claims 102, assigning claims 102 to different instances of the user interface 116 that are associated with different human reviewers, machine learning systems, payment systems, and/or any other type of functionality described herein.

In various examples, the processor(s) 306 can be a central processing unit (CPU), a graphics processing unit (GPU), or both CPU and GPU, or any other type of processing unit. Each of the one or more processor(s) 306 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 306 may also be responsible for executing all computer applications stored in the memory 302, which can be associated with common types of volatile (RAM) and/or nonvolatile (ROM) memory.

The communication interfaces 308 can include transceivers, modems, interfaces, and/or other components that perform or assist in exchanging data between elements of the claim adjudication system 100 and/or with outside elements. For example, the communication interfaces 308 can be used to receive claims 102 from providers, intermediaries, or other entities, and/or to send messages about claim decisions 114 to providers, plan participants, and/or other entities.

A display 310 can be a liquid crystal display or any other type of display used in computing devices, or a connection to an external display. In some examples, a display 310 can be a touch-sensitive display screen, and can accordingly also act as an input device 314.

Output devices 312 can include any sort of output devices known in the art, such as a display 310 or speakers. Output devices 312 can also include ports for one or more peripheral devices, such as headphones, peripheral speakers, and/or a peripheral display.

Input devices 314 can include any sort of input devices known in the art, such as a microphone, a keyboard, and/or a touch-sensitive display, such as the touch-sensitive display screen described above.

The machine readable medium 318 can store one or more sets of instructions, such as software or firmware, that embodies any one or more of the methodologies or functions described herein. The instructions can also reside, completely or at least partially, within the memory 302, processor(s) 306, and/or communication interface(s) 308 during execution thereof by the claim adjudication system 100. The memory 302 and the processor(s) 306 can also constitute machine readable media 318.

Example Operations

Figure 4:
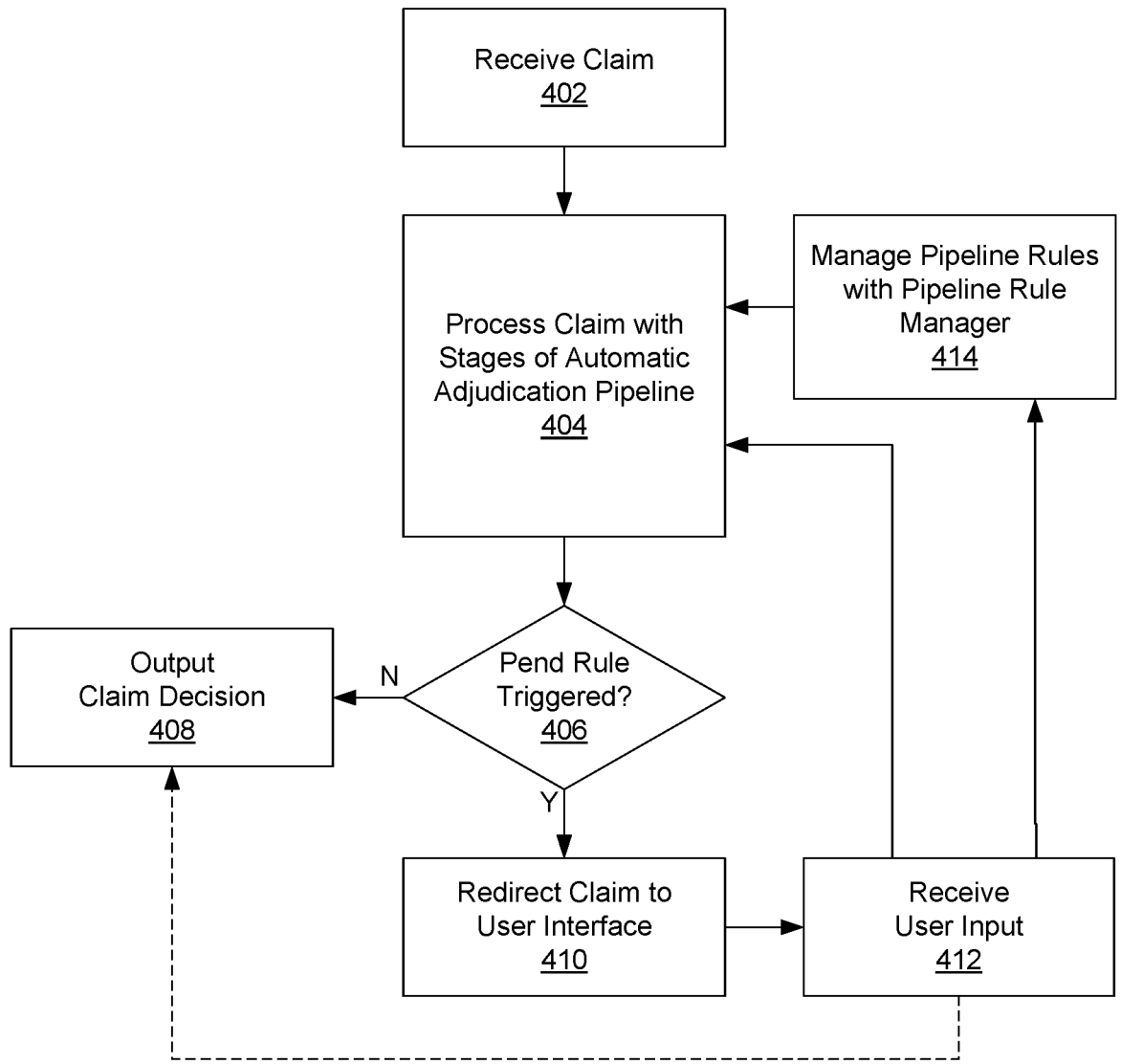
FIG. 4 depicts a flow chart of an example process for adjudicating a claim using a claim adjudication system.

FIG. 4 depicts a flow chart of an example process for adjudicating a claim 102 using a claim adjudication system 100.

At block 402, the claim adjudication system 100 can receive a claim 102. For example, a claims ingestor 104 may receive a claim 102 from a provider, intermediary, or other entity, and if necessary transform the data in the claim 102 into a format expected by the automatic adjudication pipeline 106.

At block 404, the claim adjudication system 100 can process the claim 102 at stages of the automatic adjudication pipeline 106, based at least in part on pipeline rules 112. The stage of the automatic adjudication pipeline 106 may also use other data to process the claim 102, including benefit plan data 108 and/or participant data 110. As discussed above, stages of the automatic adjudication pipeline 106 can include an eligibility determiner 118, a benefit categorizer 120, a plan coverage identifier 122, a claim bundler 124, and/or a cost sharing determiner 126. Output of an individual stage can be provided to the next stage, to a pipeline rule manager 138, and/or a user interface 116 as described above.

At block 406, a pend rule evaluator 128 of the claim adjudication system 100 can determine if one or more pend rules have been triggered with respect to the claim 102, either during processing of the claim 102 during individual stages or across the cumulative processing of a claim by multiple stages. As discussed above, pend rules can be associated with error conditions or policy conditions that indicate a claim 102 should be manually reviewed. If the pend rule evaluator 128 determines at block 406 that no pend rule has been triggered with respect to the claim 102, the claim adjudication system 100 can output a final claim decision 114 at block 408.

However, if at block 406 the pend rule evaluator 128 determines that the claim 102 has triggered one or more pend rules, the claim adjudication system 100 can redirect the claim 102 to a user interface 116 for manual review at block 410. For example, the claim adjudication system 100 can issue a claim alert 132 that indicates that the claim 102 is to be redirected to the user interface 116, and/or why the claim 102 should be manually reviewed. As discussed above, the user interface 116 can display data about the claim 102, including in a claims table 214. Information relevant to the triggered pend rules can be presented in a flagged line 220 with a distinct visual format as shown in the example of FIG. 2, such that a user can more easily distinguish what types of information caused the claim 102 to be send to the user interface 116 for manual review. Additional details associated with redirecting a claim 102 to a user interface 116 are described below with reference to FIG. 5.

At block 412, the claim adjudication system 100 can receive user input 134 via the user interface 116. For example, a user can select a flagged line 220 to bring up an edit panel 222 that allows the user to enter user input 134 to edit the claim 102 in a way that fixes a condition that triggered a pend rule. As another example, a user can enter an override instruction as user input 134 to indicate that a pend rule should not have been triggered based on the current claim data.

After receipt of the user input 134 and a selection of an adjudication option 218 to return the claim 102 back to the automatic adjudication pipeline 106, the claim adjudication system 100 can return to block 404 to repeat the automatic adjudication of the claim 102 via the stages of the automatic adjudication pipeline 106, now additionally based at least in part on the user input 134. If instead the user input 134 received during block 412 was sufficient to issue a final claim decision 114, the claim adjudication system 100 can move to block 408 and output the final claim decision 114.

User input 134 received at block 412 can also be provided to the pipeline rule manager 138, such that at block 414 the pipeline rule manager 138 can use the user input 134 to review and potentially change pipeline rules 112. For example, as described above, the pipeline rule manager 138 can use machine learning based on user input 134 and stage data 130 to alter pipeline rules 112 or create new pipeline rules 112 that can, over time, cause fewer claims 102 to be redirected from the automatic adjudication pipeline 106 to the user interface 116. Example flow diagrams associated with the pipeline rule manager's evaluation of pipeline rules 112 based on user input 134 are discussed below with respect to FIGS. 6 and 7. New or different pipeline rules 112 generated by the pipeline manager at block 414 can be provided to the automatic adjudication pipeline 106, such that the automatic adjudication pipeline 106 can use those new or different pipeline rules 112 at block 404 to process the claim 102 or subsequent claims 102.

Figure 5:
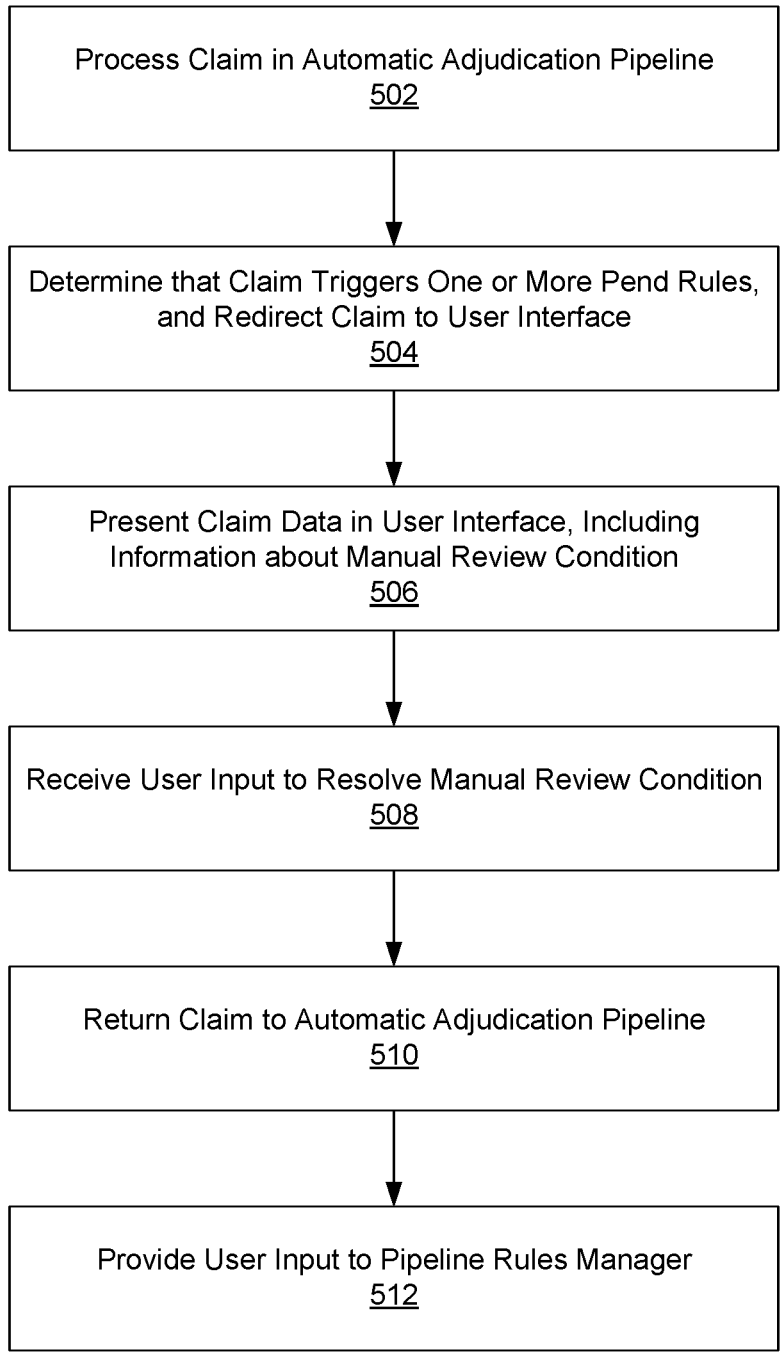
FIG. 5 depicts a flow chart of an example process for redirecting a claim from an automatic adjudication pipeline to a user interface.

FIG. 5 depicts a flow chart of an example process for redirecting a claim 102 from an automatic adjudication pipeline 106 to a user interface 116.

At block 502, the automatic adjudication pipeline 106 can automatically, without human interaction, process a claim 102 at one or more stages based on pipeline rules 112. As discussed above, the pipeline rules 112 can include computer-implemented instructions and/or other rules that define adjudication rules for processing claims 102 automatically at each stage without human interaction, as well as pend rules associated with manual review conditions upon which claims 102 should be manually reviewed.

At block 504, a pend rule evaluator 128 serving as a final stage of the automatic adjudication pipeline 106 or that evaluates output of the automatic adjudication pipeline 106 can determine that the claim 102 triggered one or more pend rules, as described above. The claim adjudication system 100 can redirect the claim 102 to a user interface 116 based on the determination that one or more pend rules associated with manual review conditions applies to the claim 102.

At block 506, the user interface 116 can display information about the claim 102. For example, the user interface 116 can display including adjudication rules and errors 202, claim overview data 204, participant data 206, provider data 208, incident data 210, diagnosis data 212, claims table 214, accumulator data 216, and/or any other information in a cohesive and integrated presentation such that relevant information a user is most likely to need to process the claim 102 is displayed in the same presentation. In particular, the user interface 116 can display information related to one or more manual review conditions that caused the automatic adjudication pipeline 106 to halt automatic processing of the claim 102 during block 504. The user interface 116 can display the information related to the manual review conditions in an adjudication rules and errors 202 section and/or in a distinct visual format such as a flagged line 220 of a claims table 214 so that a user is more likely to see that information and understand why the claim 102 was redirected for manual review.

At block 508, the user interface 116 can receive user input 134 that resolves the manual review conditions. For example, a user can select specific information within the user interface 116, the selection of which causes the user interface 116 to present an edit panel 222 within the same user interface 116. The user can use the edit panel 222 to provide user input 134 that edits information about the claim 102. As another example, a user can provide an override instruction as user input 134 in an edit panel 222 or other element of the user interface 116 to indicate that the current information about the claim 102 does not need to be edited and that a pend rule or manual review condition does not apply to the claim 102.

At block 510, the claim 102 can be returned to the automatic adjudication pipeline 106 to be re-processed automatically based on the user input 134 provided during block 508.

At block 512, the user input 134 provided during block 508 can also be provided to a pipeline rule manager 138. The pipeline rule manager 138 can use the provided user input 134 as training data for machine learning to adjust pipeline rules 112. Example flow diagrams associated with the pipeline rule manager's evaluation of pipeline rules 112 based on user input 134 are discussed below with respect to FIGS. 6 and 7.

Figure 6:
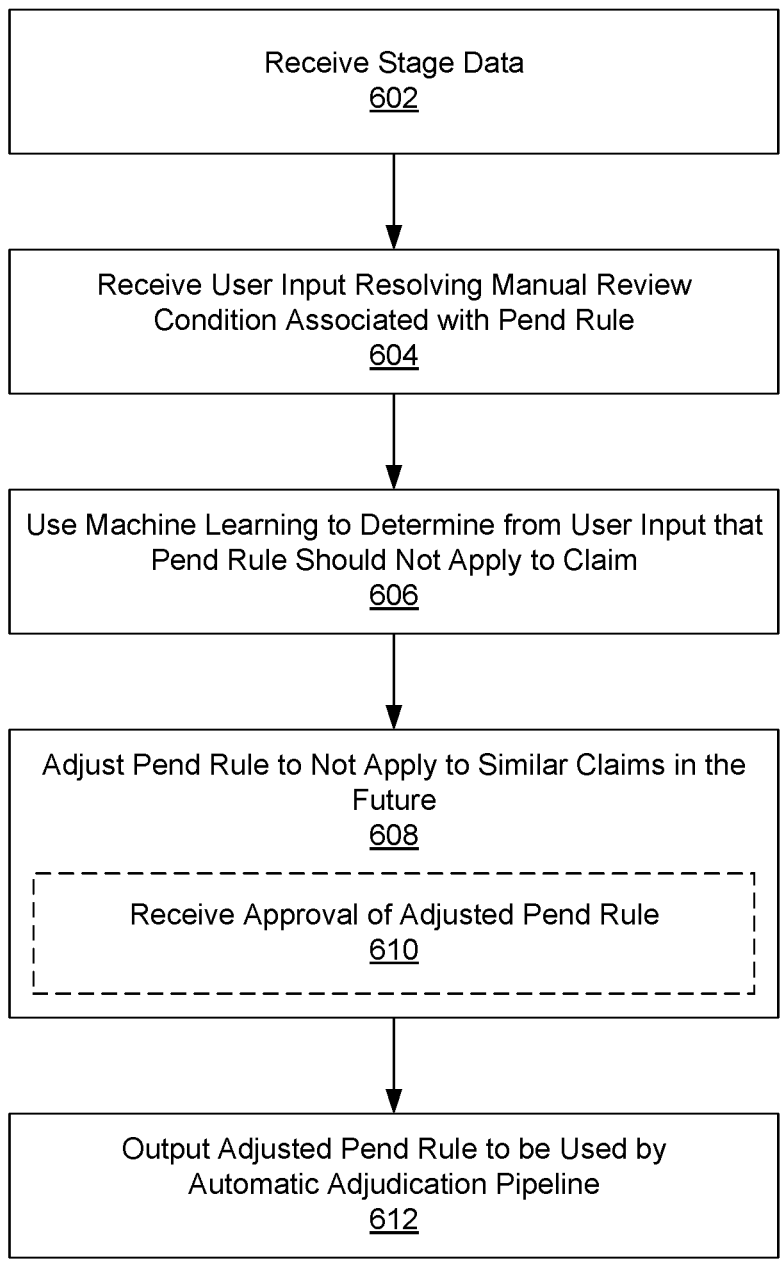
FIG. 6 depicts a flow diagram of a first example method of adjusting pipeline rules with the pipeline rule manager.

FIG. 6 depicts a flow diagram of a first example method of adjusting pipeline rules 112 with the pipeline rule manager 138.

At block 602, the pipeline rule manager 138 can receive stage data 130 indicating how one or more stages of an automatic adjudication pipeline 106 processed a claim 102, including original data about the claim 102 and/or outputs of one or more stages of the automatic adjudication pipeline 106. The stage data 130 can also indicate which pipeline rules 112 were applied to the claim 102, including identification of any pend rules that caused the claim 102 to be redirected to a user interface 116 for manual review.

At block 604, the pipeline rule manager 138 can receive user input 134 provided by a user via the user interface 116 to resolve manual review conditions associated with the triggered pend rules. For example, the user input 134 at block 604 can be an explicit override instruction indicating that a manual review condition should not apply to the claim 102, or an implicit override instruction indicating that a manual review condition should not apply to the claim 102 when a user does not edit the claim 102 and approves the current information about the claim 102 despite a triggered pend rule.

At block 606, the pipeline rule manager 138 can use machine learning to determine from the user input 134 received during block 604 that a pend rule should not apply to future claims 102 with similar attributes that triggered the pend rule for the current claim 102. For example, if a particular pend rule consistently causes a certain type of claim 102 to be redirected to the user interface 116 for manual review due to a particular manual review condition, but user input 134 consistently includes override instructions indicating that the particular pend rule should not apply to that type of claim 102, the pipeline rule manager 138 can learn over time that the particular pend rule should not apply to that type of claim 102. Accordingly, at block 608 the pipeline rule manager 138 can adjust pend rules, such as by deleting the triggered pend rule or modifying the triggered pend rule to include attributes indicating that the pend rule does not apply to this type of claim 102, such that the pend rule is not triggered for similar future claims 102.

In some examples, the pipeline rule manager's adjustment to pend rules at block 608 can be done on a preliminary basis, and include outputting suggested adjustments to pend rules to a review queue at block 610 so that a user can review and approve or deny the suggested changes. For example, the pipeline rule manager 138 can suggest changes to a pend rule in a review queue at block 608, but wait until a user approves the suggested changes at block 610 before outputting the adjusted pend rule at block 612 to be implemented by the automatic adjudication pipeline 106. However, in other examples block 610 can be absent, such that the pipeline rule manager 138 can move directly to block 612 after determining how a pend rule should be adjusted, without waiting for manual evaluation and approval of the adjustments.

At block 612, the pipeline rule manager 138 can output the adjustments to the pend rule to a database of pipeline rules 112, to be implemented by the automatic adjudication pipeline 106.

Figure 7:
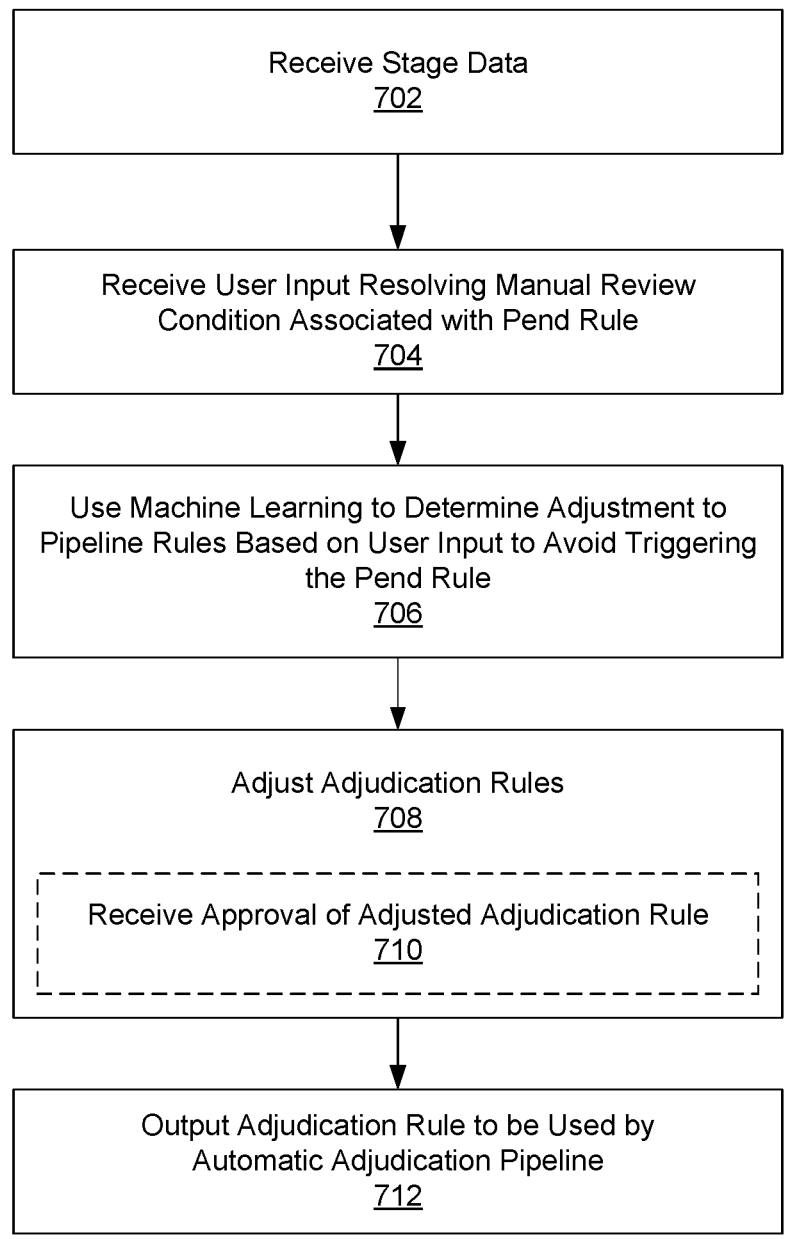
FIG. 7 depicts a flow diagram of a second example method of adjusting pipeline rules with the pipeline rule manager.

FIG. 7 depicts a flow diagram of a second example method of adjusting pipeline rules 112 with the pipeline rule manager 138.

At block 702, the pipeline rule manager 138 can receive stage data 130 indicating how one or more stages of an automatic adjudication pipeline 106 processed a claim 102, including original data about the claim 102 and/or outputs of one or more stages of the automatic adjudication pipeline 106. The stage data 130 can also indicate which pipeline rules 112 were applied to the claim 102, including identification of any pend rules that caused the claim 102 to be redirected to a user interface 116 for manual review.

At block 704, the pipeline rule manager 138 can receive user input 134 provided by a user via the user interface 116 to resolve manual review conditions associated with the triggered pend rules. For example, the user input 134 at block 704 can be new values for data associated with the claim 102 or other instructions to edit the claim 102 so that the manual review condition no longer applies to the claim 102. For example, if a manual review condition was triggered because a benefit categorizer 120 of the automatic adjudication pipeline 106 could not find a benefit of a benefit plan that matched a particular billing code in the claim 102, but a user provided user input 134 via the user interface 116 to manually add an appropriate benefit name for that billing code, the user input 134 can resolve the manual review condition such that a similar unknown-benefit error would not occur if the claim 102 were re-evaluated by the benefit categorizer 120.

At block 706, the pipeline rule manager 138 can use machine learning to determine an adjustment to the pipeline rules 112 that would cause the manual review condition to no longer apply to similar claims in the future, based at least in part on the user input 134 received during block 704. For example, if over time the pipeline rule manager 138 determines that user input 134 consistently edits claims 102 to add a particular benefit name in association with a particular billing code that was previously unknown to the benefit categorizer 120, the pipeline rule manager's machine learning can determine that adjudication rules used by the benefit categorizer 120 should recognize that the particular billing code corresponds to the particular benefit name added by the user input 134. Accordingly, at block 708 the pipeline rule manager 138 can create a new adjudication rule or modify an existing adjudication rule based on the machine learning. For example, the pipeline rule manager 138 can adjust adjudication rules so that future claims 102 with the previously unknown billing code discussed above are processed with respect to the corresponding benefit identified by past user input 134 during stages of the automatic adjudication pipeline 106, without needing to redirect the claim 102 to the user interface 116 for manual entry of the benefit name.

In some examples, the pipeline rule manager's adjustment to adjudication rules at block 708 can be done on a preliminary basis, and include outputting suggested adjustments to pend rules to a review queue at block 710 so that a user can review and approve or deny the suggested changes. For example, the pipeline rule manager 138 can suggest changes to an adjudication rule in a review queue at block 708, but wait until a user approves the suggested changes at block 710 before outputting the adjusted adjudication rule at block 710 to be implemented by the automatic adjudication pipeline 106. However, in other examples block 710 can be absent, such that the pipeline rule manager 138 can move directly to block 712 after determining how an adjudication rule should be adjusted, without waiting for manual evaluation and approval of the adjustments.

At block 712, the pipeline rule manager 138 can output the new or modified adjudication rule to a database of pipeline rules 112, to be implemented by the automatic adjudication pipeline 106.

EXAMPLE CLAUSES

A. A computer-implemented method comprising: receiving a data structure representing a claim that is submitted by an entity, the data structure identifying one or more services rendered for a plan participant covered by a benefit plan; analyzing, via one or more pipeline rules reflecting computer-implemented instructions for adjudicating the claim automatically without human interaction, data associated with the data structure, wherein the one or more rules are associated with one or more stages of an automatic adjudication pipeline and wherein the one or more rules include pend rules that define manual review conditions; during automatic processing of the data structure, determining that at least one pend rule associated with at least one manual review condition applies to the data associated with the data structure; redirecting adjudication of the claim from the automatic adjudication pipeline to a user interface for manual review of the claim upon the determination that the at least one pend rule applies to the data associated with the data structure; displaying, in the user interface, information associated with the at least one manual review condition that caused the adjudication of the claim to be redirected for manual review in a distinct visual format relative to other information about the claim; receiving, via the user interface, user input to resolve the at least one manual review condition; altering, by a pipeline rule manager, one or more of the one or more pipeline rules based on machine learning trained on the user input; and returning the data structure from the user interface to the automatic adjudication pipeline to be analyzed by the one or more pipeline rules based at least in part on the user input.

B. The computer-implemented method as paragraph A recites, wherein the pipeline rule manager additionally uses stage data indicating how the one or more stages of the automatic adjudication pipeline automatically processed the data structure as training data for the machine learning.

C. The computer-implemented method as any of paragraphs A and B recite, wherein the manual review conditions defined by the pend rules include at least one of an error condition or a policy condition that indicates that the claim is to be manually reviewed.

D. The computer-implemented method as any of paragraphs A-C recite, wherein the user interface presents the information associated with the manual review condition and the other information about the claim in a single presentation.

E. The computer-implemented method as any of paragraphs A-D recite, wherein receiving the user input comprises: receiving a user selection of specific information about the claim displayed in the user interface; and displaying an edit panel within the user interface in association with the specific information, wherein the edit panel is configured to receive the user input to edit the specific information about the claim in the data structure.

F. The computer-implemented method as any of paragraphs A-E recite, wherein the user input comprises an override instruction indicating that the pend rule does not apply to the claim.

G. The computer-implemented method as any of paragraphs A-F recite, wherein the one or more stages of the automatic adjudication pipeline include an eligibility determiner that determines whether the plan participant is eligible for coverage under the benefit plan, a benefit categorizer that identifies a benefit associated with the claim based on information within the data structure, a plan coverage identifier that identifies coverage provided by the benefit plan for the benefit, a claim bundler that identifies an episode of care associated with multiple services within at least the claim and one or more other claims, or a cost sharing determiner that determines a first portion of a cost associated with the claim to be paid by the plan participant and a second portion of the cost to be paid by a second entity.

H. The computer-implemented method as any of paragraphs A-G recite, wherein the one or more stages of the automatic adjudication pipeline are modular and individually configurable.

I. A claim adjudication system comprising: an automatic adjudication pipeline including one or more stages configured to automatically process a data structure representing a claim submitted by an entity without human interaction based at least in part on pipeline rules including pend rules that define manual review conditions, wherein the data structure representing the claim identifies one or more services rendered for a plan participant covered by a benefit plan; a user interface configured to receive the data structure representing the claim from the automatic adjudication pipeline in response to a determination by the automatic adjudication pipeline that a pend rule associated with a manual review condition applies to the claim, wherein the user interface: displays information associated with the manual review condition that caused the claim to be redirected for manual review in a distinct visual format relative to other information about the claim; receives user input to resolve the manual review condition; and returns the claim to the automatic adjudication pipeline; and a pipeline rule manager configured to alter one or more of the pipeline rules based on machine learning trained on the user input received by the user interface.

J. The claim adjudication system as paragraph I recites, wherein the pipeline rule manager additionally uses stage data indicating how the one or more stages of the automatic adjudication pipeline automatically processed the claim as training data for the machine learning.

K. The claim adjudication system as any of paragraphs I and J recite, wherein the manual review conditions defined by the pend rules include at least one of an error condition or a policy condition that indicates that the claim is to be manually reviewed.

L. The claim adjudication system as any of paragraphs I-K recite, wherein the user interface presents the information associated with the manual review condition and the other information about the claim in a single presentation.

M. The claim adjudication system as any of paragraphs I-L recite, wherein the user interface is configured to receive the user input by: receiving a user selection of specific information about the claim displayed in the user interface; and displaying an edit panel within the user interface in association with the specific information, wherein the edit panel is configured to receive the user input to edit the specific information about the claim.

N. The claim adjudication system as any of paragraphs I-M recite, wherein the user input comprises an override instruction indicating that the pend rule does not apply to the claim.

O. The claim adjudication system as any of paragraphs I-N recite, wherein the one or more stages of the automatic adjudication pipeline include an eligibility determiner that determines whether the plan participant is eligible for coverage under the benefit plan, a benefit categorizer that identifies a benefit associated with the claim based on information within the data structure, a plan coverage identifier that identifies coverage provided by the benefit plan for the benefit, a claim bundler that identifies an episode of care associated with multiple services within at least the claim and one or more other claims, or a cost sharing determiner that determines a first portion of a cost associated with the claim to be paid by the plan participant and a second portion of the cost to be paid by a second entity.

P. One or more non-transitory computer-readable media storing computer-executable instructions that, when executed by one or more processors, cause the one or more processors to perform operations comprising: receiving a data structure representing a claim submitted by an entity, the claim identifying one or more services rendered for a plan participant covered by a benefit plan; processing the claim automatically, without human interaction, with one or more stages of an automatic adjudication pipeline, based at least in part on pipeline rules including pend rules that define manual review conditions; during automatic processing of the data structure, determining that at least one pend rule associated with a manual review condition applies to the data structure; redirecting the data structure from the automatic adjudication pipeline to a user interface for manual review of the claim upon the determination that the at least one pend rule applies to the claim; displaying, in the user interface, information associated with the at least one manual review condition that caused the claim to be redirected for manual review in a distinct visual format relative to other information about the claim; receiving user input, via the user interface, to resolve the at least one manual review condition; altering, by a pipeline rule manager, one or more of the pipeline rules based on machine learning trained on the user input; and returning the claim from the user interface to the automatic adjudication pipeline to be analyzed by the one or more pipeline rules based at least in part on the user input.

Q. The non-transitory computer-readable media as paragraph P recites, wherein the pipeline rule manager additionally use stage data indicating how the one or more stages of the automatic adjudication pipeline automatically processed the claim as additional training data for the machine learning.

R. The non-transitory computer-readable media as any of paragraphs P and Q recite, wherein the user interface presents the information associated with the manual review condition and the other information about the claim in a single presentation.

S. The non-transitory computer-readable media as any of paragraphs P-R recite, wherein the receiving the user input comprises: receiving a user selection of specific information about the claim displayed in the user interface; and displaying an edit panel within the user interface in association with the specific information, wherein the edit panel is configured to receive the user input to edit the specific information about the claim.

T. The non-transitory computer-readable media as any of paragraphs P-S recite, wherein the user input comprises an override instruction indicating that the pend rule does not apply to the claim.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
receiving claim data, associated with a claim, that identifies one or more services rendered by an entity for a plan participant covered by a benefit plan;
processing the claim data with an automatic adjudication pipeline comprising a plurality of modular stages, wherein:
the automatic adjudication pipeline is configured to use a plurality of pipeline rules to automatically adjudicate the claim,
different modular stages, of the plurality of modular stages, are associated with different subsets of the plurality of pipeline rules, and
one or more modular stages, of the plurality of modular stages, are configured to operate at least in part on output data generated by one or more preceding modular stages in the automatic adjudication pipeline during automatic adjudication of the claim;
determining that a manual review condition, defined by a pend rule of the plurality of pipeline rules, at least temporarily prevents the automatic adjudication pipeline from automatically adjudicating the claim;
redirecting, based on the manual review condition, adjudication of the claim from the automatic adjudication pipeline to a user interface for manual review of the claim, wherein the user interface is configured to display at least a portion of the claim data associated with the manual review condition;
receiving, via the user interface, user input indicating a resolution of the manual review condition in association with the claim;
adjusting the plurality of pipeline rules by training a machine learning model based on the resolution of the manual review condition, indicated by the user input, wherein the training of the machine learning model:
causes at least one pipeline rule, of the plurality of pipeline rules, to automatically apply the resolution of the manual review condition during automatic processing of subsequent claim data associated with at least one claim in a set of subsequent claims, and
reduces a number of claims, in the set of subsequent claims, that are redirected from the automatic adjudication pipeline to the user interface for manual review based on the manual review condition; and
processing one or more portions of the claim data with the automatic adjudication pipeline, based at least in part on the user input.

2. The computer-implemented method of claim 1, wherein the plurality of pipeline rules comprises:
one or more adjudication rules associated with automatic adjudication of the claim, and one or more pend rules defining one or more manual review conditions.

3. The computer-implemented method of claim 1, further comprising displaying, in the user interface, a claim alert identifying the manual review condition or the pend rule.

4. The computer-implemented method of claim 1, wherein the user input is an edit instruction to edit the claim data in response to the manual review condition.

5. The computer-implemented method of claim 1, wherein the user input is an override instruction indicating that the manual review condition does not apply to the claim data.

6. The computer-implemented method of claim 1, wherein the machine learning model is trained further based on stage data indicating how one or more individual modular stages, of the plurality of modular stages, processed the claim data.

7. The computer-implemented method of claim 1, wherein:
a final stage of the plurality of modular stages is a pend rule evaluator, and
the pend rule evaluator is configured to determine that processing of the claim data by one or more prior stages of the plurality of modular stages triggered the pend rule.

8. The computer-implemented method of claim 1, wherein:
the manual review condition is associated with an inability of at least one of the one or more modular stages to determine a benefit code that corresponds with one of the one or more services identified in the claim data, and
the user input indicates the benefit code.

9. The computer-implemented method of claim 1, wherein the plurality of modular stages includes two or more of:
- an eligibility determiner that determines whether the plan participant is eligible for coverage under the benefit plan,
- a benefit categorizer that identifies a benefit associated with the claim based on information within the claim data,
- a plan coverage identifier that identifies coverage provided by the benefit plan for the benefit,
- a claim bundler that identifies an episode of care associated with multiple services within at least the claim and one or more other claims, or
- a cost sharing determiner that determines a first cost portion of a cost associated with the claim to be paid by the plan participant and a second cost portion of the cost to be paid by a second entity.

10. One or more computing devices comprising:
one or more processors; and
memory storing computer-executable instructions that, when executed by the one or more processors, cause the one or more processors to:
- receive claim data, associated with a claim, that identifies one or more services rendered by an entity for a plan participant covered by a benefit plan;
- process the claim data with an automatic adjudication pipeline comprising a plurality of modular stages, wherein:
  - the automatic adjudication pipeline is configured to use a plurality of pipeline rules to automatically adjudicate the claim,
  - different modular stages, of the plurality of modular stages, are associated with different subsets of the plurality of pipeline rules, and
  - one or more modular stages, of the plurality of modular stages, are configured to operate, at least in part, on output data generated by one or more preceding modular stages in the automatic adjudication pipeline during automatic adjudication of the claim;
- determine that a manual review condition, defined by a pend rule of the plurality of pipeline rules, at least temporarily prevents the automatic adjudication pipeline from automatically adjudicating the claim;
- redirect, based on the manual review condition, adjudication of the claim from the automatic adjudication pipeline to a user interface for manual review of the claim, wherein the user interface is configured to display at least a portion of the claim data associated with the manual review condition;
- receive, via the user interface, user input indicating a resolution of the manual review condition in association with the claim;
- adjust the plurality of pipeline rules by training a machine learning model based on the resolution of the manual review condition, indicated by the user input, wherein the training of the machine learning model:
  - causes at least one pipeline rule, of the plurality of pipeline rules, to automatically apply the resolution of the manual review condition during automatic processing of subsequent claim data associated with at least one claim in a set of subsequent claims, and
  - reduces a number of claims, in the set of subsequent claims, that are redirected from the automatic adjudication pipeline to the user interface for manual review based on the manual review condition; and
- process one or more portions of the claim data with the automatic adjudication pipeline, based at least in part on the user input.

11. The one or more computing devices of claim 10, wherein the plurality of pipeline rules comprises:
- one or more adjudication rules associated with automatic adjudication of the claim, and
- one or more pend rules defining one or more manual review conditions.

12. The one or more computing devices of claim 10, wherein the computer-executable instructions further cause the one or more processors to display, in the user interface, a claim alert identifying the manual review condition or the pend rule.

13. The one or more computing devices of claim 10, wherein the user input is at least one of:
- an edit instruction to edit the claim data in response to the manual review condition, or
- an override instruction indicating that the manual review condition does not apply to the claim data.

14. One or more non-transitory computer-readable media storing computer-executable instructions that, when executed by one or more processors, cause the one or more processors to perform operations comprising:
- receiving claim data, associated with a claim, that identifies one or more services rendered by an entity for a plan participant covered by a benefit plan;
- processing the claim data with an automatic adjudication pipeline comprising a plurality of modular stages, wherein:
  - the automatic adjudication pipeline is configured to use a plurality of pipeline rules to automatically adjudicate the claim,
  - different modular stages, of the plurality of modular stages, are associated with different subsets of the plurality of pipeline rules, and
  - one or more modular stages, of the plurality of modular stages, are configured to operate, at least in part, on output data generated by one or more preceding modular stages in the automatic adjudication pipeline during automatic adjudication of the claim;
- determining that a manual review condition, defined by a pend rule of the plurality of pipeline rules, at least temporarily prevents the automatic adjudication pipeline from automatically adjudicating the claim;
- redirecting, based on the manual review condition, adjudication of the claim from the automatic adjudication pipeline to a user interface for manual review of the claim, wherein the user interface is configured to display at least a portion of the claim data associated with the manual review condition;
- receiving, via the user interface, user input indicating a resolution of the manual review condition in association with the claim;
- adjusting the plurality of pipeline rules by training a machine learning model based on the resolution of the manual review condition, indicated by the user input, wherein the training of the machine learning model;
  - causes at least one pipeline rule, of the plurality of pipeline rules, to automatically apply the resolution of the manual review condition during automatic processing of subsequent claim data associated with at least one claim in a set of subsequent claims, and reduces a number of claims, in the set of subsequent claims, that are redirected from the automatic adjudication pipeline to the user interface for manual review based on the manual review condition; and processing one or more portions of the claim data with the automatic adjudication pipeline, based at least in part on the user input.

15. The one or more non-transitory computer-readable media of claim 14, wherein the plurality of pipeline rules comprises:

one or more adjudication rules associated with automatic adjudication of the claim, and one or more pend rules defining one or more manual review conditions.

16. The one or more non-transitory computer-readable media of claim 14, wherein the operations further comprise displaying, in the user interface, a claim alert identifying the manual review condition or the pend rule.

17. The one or more non-transitory computer-readable media of claim 14, wherein the user input is at least one of:

an edit instruction to edit the claim data in response to the manual review condition, or an override instruction indicating that the manual review condition does not apply to the claim data.

18. The one or more computing devices of claim 10, wherein the machine learning model is trained further based on stage data indicating how one or more individual modular stages, of the plurality of modular stages, processed the claim data.

19. The one or more non-transitory computer-readable media of claim 14, wherein the machine learning model is trained further based on stage data indicating how one or more individual modular stages, of the plurality of modular stages, processed the claim data.

20. The computer-implemented method of claim 1, further comprising displaying a claims table in the user interface, wherein:

the claims table comprises a plurality of lines indicating information associated with the one or more services identified by the claim data, at least one line, of the plurality of lines, is a flagged line that indicates at least the portion of the claim data associated with the manual review condition, and the flagged line is displayed within the claims table in a distinct visual format relative to one or more other lines, of the plurality of lines, that indicate one or more other portions of the claim data that are not associated with the manual review condition.

* * * * *